United States Patent
Zhang

(10) Patent No.: US 12,028,911 B2
(45) Date of Patent: Jul. 2, 2024

(54) COMMUNICATION METHOD, RELATED APPARATUS, AND DEVICE

(71) Applicant: Tencent Technology (Shenzhen) Company Limited, Guangdong (CN)

(72) Inventor: Zhuoyun Zhang, Guangdong (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 364 days.

(21) Appl. No.: 17/483,318

(22) Filed: Sep. 23, 2021

(65) Prior Publication Data

US 2022/0015163 A1 Jan. 13, 2022

Related U.S. Application Data

(63) Continuation of application No. PCT/CN2020/115558, filed on Sep. 16, 2020.

(30) Foreign Application Priority Data

Sep. 27, 2019 (CN) .......................... 201910925512.1

(51) Int. Cl.
*H04W 76/11* (2018.01)
*H04W 8/24* (2009.01)

(52) U.S. Cl.
CPC .............. *H04W 76/11* (2018.02); *H04W 8/24* (2013.01)

(58) Field of Classification Search
CPC ................................. H04W 76/11; H04W 8/24
See application file for complete search history.

(56) References Cited

U.S. PATENT DOCUMENTS

| 11,212,742 | B2* | 12/2021 | Xi | H04W 48/16 |
| 11,818,800 | B2* | 11/2023 | Jeong | H04W 48/16 |
| 2018/0199398 | A1* | 7/2018 | Dao | H04L 41/5041 |
| 2019/0191330 | A1* | 6/2019 | Dao | H04L 69/22 |
| 2019/0215730 | A1* | 7/2019 | Qiao | H04W 28/24 |
| 2019/0253917 | A1* | 8/2019 | Dao | H04M 15/00 |
| 2019/0394833 | A1* | 12/2019 | Talebi Fard | H04W 68/005 |
| 2020/0045753 | A1* | 2/2020 | Dao | H04W 4/08 |
| 2020/0059761 | A1* | 2/2020 | Li | H04L 63/0892 |

(Continued)

FOREIGN PATENT DOCUMENTS

| CN | 107995603 A | 5/2018 |
| CN | 108337705 A | 7/2018 |

(Continued)

OTHER PUBLICATIONS

International Search Report issued Nov. 27, 2020 in International Application No. PCT/CN2020/115558 with English translation, 11 pgs.

(Continued)

*Primary Examiner* — Parth Patel
(74) *Attorney, Agent, or Firm* — ArentFox Schiff LLP

(57) ABSTRACT

A communication method for exposing a user plane event includes allowing an NF entity to subscribe to the user plane event by sending a request to a UPF entity through an SMF entity. The SMF entity forwards requests and responses sent between the NF entity and the UPF entity. Because the SMF entity transparently transmits requests and response messages between the NF entity and the UPF entity, the impact on the performance of the SMF entity is minimized.

19 Claims, 8 Drawing Sheets

(56) References Cited

U.S. PATENT DOCUMENTS

| | | | | |
|---|---|---|---|---|
| 2020/0112921 | A1* | 4/2020 | Han | H04W 24/02 |
| 2020/0329008 | A1* | 10/2020 | Dao | H04L 61/5007 |
| 2021/0051235 | A1* | 2/2021 | Cai | H04L 41/0894 |
| 2021/0092588 | A1* | 3/2021 | Xin | H04W 60/00 |
| 2021/0168905 | A1* | 6/2021 | Yu | H04W 76/15 |
| 2021/0250192 | A1* | 8/2021 | Alonso Franco | H04M 15/66 |
| 2021/0400146 | A1* | 12/2021 | Muñoz De La Torre Alonso | H04M 15/66 |
| 2022/0015163 | A1* | 1/2022 | Zhang | H04W 8/20 |
| 2022/0038946 | A1* | 2/2022 | Kim | H04W 28/0284 |
| 2022/0191664 | A1* | 6/2022 | Muñoz De La Torre Alonso | H04L 67/14 |
| 2022/0191665 | A1* | 6/2022 | Hong | H04W 8/20 |
| 2022/0232369 | A1* | 7/2022 | Puente Pestaña | H04W 8/20 |
| 2022/0248273 | A1* | 8/2022 | Sama | H04W 88/18 |
| 2022/0330085 | A1* | 10/2022 | Li | H04L 67/63 |
| 2023/0291841 | A1* | 9/2023 | Muñoz De La Torre Alonso | H04M 15/66 455/406 |

FOREIGN PATENT DOCUMENTS

| | | |
|---|---|---|
| CN | 109756430 A | 5/2019 |
| CN | 109951824 A | 6/2019 |
| CN | 110035465 A | 7/2019 |
| CN | 110169140 A | 8/2019 |
| CN | 110621032 A | 12/2019 |
| JP | 109673060 A | 4/2019 |

OTHER PUBLICATIONS

Chinese Office Action issued Sep. 25, 2020 in Chinese Application No. 201910925512.1 with English translation, 9 pgs.

Tencent. "UP connection Deactivation for URLLC PDU Session", SA WG2 Meeting #132 S2-1903095, Apr. 12, 2019 (Apr. 12, 2019), entire document.

Japanese Office Action in 2021-552613, mailed Sep. 27, 2022, with English Translation, 8 pages.

3rd Generation Partnership Project; Technical Specification Group Core Network and Terminals; 5G System; Session Management Event Exposure Service; Stage 3, Release 16, 3GPP TS 29.508 V16.0.0, Jun. 18, 2019.

Chinese Office Action issued Feb. 3, 2021 in Chinese Application No. 201910925512.1 with English translation, 7 pgs.

Adding SMF Service Context Transfer procedure-push model, 3GPP TSG-SA2 Meeting #134 S2-1907678, Sapporo, Japan, Jun. 24-28, 2019, 4 pgs.

Supplementary European Search Report in 20867454.9, mailed Jul. 5, 2022, 11 pages.

Ericsson: "Nupf eventexposure", 3GPP Draft; S2-1901733_ENA_UPF_Eventexposure_23.502, 3rd Generation Partnership Project (3GPP), Mobile Competence Centre ; 650, Route Des Lucioles ; F-06921 Sophia-Antipolis Cedex ; FRANCE, vol. SA WG2, No. Santa Cruz, Tenerife, Spain; Feb. 25, 2019-Mar. 1, 2019, Feb. 19, 2019.

SA WG2: "New SID: Study on UPF enhancement for control and SBA", 3GPP Draft; S2-1908415-SP-190187_S2-1902933_E-Mail_REV 13_S2-1902841_SIDUPF, 3rd Generation Partnership Project (3GPP), Mobile Competence Centre ; 650, Route Des Lucioles ; F-06921 Sophia-Antipolis Ced vol. SA WG2, No. Sapporo, Japan; Jun. 24, 2019-Jun. 28, 2019, Jun. 28, 2019.

Orange et al: "User Plane information for Communication analytics", 3GPP Draft; S2-1902975_Userplaneinfo_for_Communication Analytics, 3rd Generation Partnership Project (3GPP), Mobile Competence Centre ; 650, Route Des Lucioles ; F-06921 Sophia-Antipolis Cedex ; France vol. SA WG2, No. Xi'an, China; Apr. 8, 2019-Apr. 12, 2019, Apr. 2, 2019.

* cited by examiner

COMMUNICATION METHOD, RELATED APPARATUS, AND DEVICE

RELATED APPLICATIONS

This application is a continuation of International Application No. PCT/CN2020/115558, filed on Sep. 16, 2020, which claims priority to Chinese Patent Application No. 201910925512.1, entitled "COMMUNICATION METHOD, RELATED APPARATUS, AND DEVICE" and filed on Sep. 27, 2019. The entire disclosures of the prior applications are hereby incorporated by reference in their entirety.

FIELD OF THE TECHNOLOGY

This application relates to the communication field, including a communication method and device.

BACKGROUND OF THE DISCLOSURE

With the continuous development of communication technologies, research on and standardization of the $5^{th}$ generation mobile communication technology (5G) have started. In a signaling plane, a session management function (SMF) in a core network can allocate resources, such as a user plane function (UPF), to a terminal device. In a user plane, the terminal device can establish a connection to the UPF and transmit service data through the connection.

Currently, based on a 5G network architecture of 3rd Generation Partnership Project (3GPP) R15/R16 standards, an SMF on a control plane is connected to a UPF on a user plane by an N4 interface, thereby implementing the management of the user plane.

However, in the current network architecture, information on the UPF on the user plane cannot be efficiently and flexibly exposed to other network functions (NFs) on a control plane other than the SMF. As a result, it is difficult for the other NFs on the control plane to perform policy control or perform big data analysis based on a service data status of the user plane.

SUMMARY

Embodiments of this application provide a communication method, a related apparatus, and a device, to expose a UPF event to an NF entity, to enable the NF entity to perceive information on a user plane, and further perform operations, such as policy control and big data analysis, based on the information on the user plane.

In an embodiment, a communication method includes receiving, by processing circuitry of a session management function (SMF) entity, a first request transmitted by a network function (NF) entity, the first request comprising a first identifier (ID) and a second ID, the first ID indicating an event, and the second ID indicating a type of the event. The communication method further includes transmitting, by the SMF entity, the first request to a user plane function (UPF) entity, and receiving, by the SMF entity, a first response transmitted by the UPF entity, the first response comprising the first ID, a third ID, and a fourth ID, the third ID indicating the NF entity, and the fourth ID indicating a request result of the event. Finally, the communication method includes transmitting, by the SMF entity, the first response to the NF entity.

In an embodiment, a communication method includes receiving, by processing circuitry of a user plane function (UPF) entity, a first request transmitted by a session management function (SMF) entity, the first request comprising a first identifier (ID) and a second ID, the first ID indicating an event, and the second ID indicating a type of the event. The communication method further includes transmitting, by the UPF entity, a first response to the SMF entity, the first response comprising the first ID, a third ID, and a fourth ID, the third ID indicating a network function (NF) entity, and the fourth ID indicating a request result of the event.

In an embodiment, a communication apparatus includes a receiver configured to receive a first request transmitted by a network function (NF) entity, the first request comprising a first identifier (ID) and a second ID, the first ID indicating an event, and the second ID indicating a type of the event. The communication apparatus also includes a transmitter configured to transmit the first request received by the receiver to a user plane function (UPF) entity, the receiver being further configured to receive a first response transmitted by the UPF entity, the first response comprising the first ID, a third ID, and a fourth ID, the third ID indicating the NF entity, and the fourth ID indicating a request result of the event. The transmitter is further configured to transmit the first response received by the receiver to the NF entity.

In the embodiments of this application, a communication method for exposing a user plane event is provided. First, an SMF entity receives a first request transmitted by an NF entity. The first request includes a first ID and a second ID. The SMF entity then transmits the first request to a UPF entity, and the SMF entity receives a first response transmitted by the UPF entity. The first response includes the first ID, a third ID, and a fourth ID. Finally, the SMF entity transmits the first response to the NF entity. In the foregoing manner, the NF entity may initiate an event subscription request, that is, the first request to the UPF entity by using the SMF entity, so that the UPF entity transmits a response, that is, the first response, to the NF entity based on the request by using the SMF entity, thereby exposing the UPF event to the NF entity. In this way, the NF entity can perceive information on a user plane, and further perform operations, such as policy control and big data analysis, based on the information on the user plane. In the embodiments of this application, because the SMF entity only transparently transmits requests and response messages between the NF entity and the UPF entity, the impact on the performance of the SMF entity is relatively small.

DESCRIPTION OF EMBODIMENTS

Embodiments of this application provide a communication method, a related apparatus, and a device, to expose a UPF event to an NF entity, to enable the NF entity to perceive information on a user plane, and further perform operations, such as policy control, based on the information on the user plane.

The terms such as "first", "second", "third", and "fourth" (if any) in the specification and claims of this application and in the accompanying drawings are used for distinguishing between similar objects and not necessarily used for describing any particular order or sequence. It may be understood that the data used in such a way is interchangeable in proper circumstances, so that the embodiments of this application described herein can be implemented in other sequences than the sequence illustrated or described herein. In addition, the terms "include", "corresponding to", and any other variants are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

It is to be understood that the communication method provided in this application is applicable to a 5G system. The communication method provided in this application may further be applied to other wireless communication systems, including, but not limited to, the Long Term Evolution (LTE) system, the Global System for Mobile Communications (GSM), and the Universal Mobile Telecommunications System (UMTS), a code division multiple access (CDMA) system, and a new network system. Specific embodiments are described below by using a 5G system as an example.

Entities included in this application are not limited to a 5G system. A UPF entity, an SMF entity, and an NF entity may alternatively be entities having the same functions or similar functions in other evolved communication systems. This is merely an example herein, and is not to be construed as a limitation on this application.

A 5G system architecture used in this application is described below based on FIG. 1A and FIG. 1B. Network function virtualization (NFV)/a software defined network (SDN) is adopted in the 5G system architecture to support data connections and flexible service deployment, and promote service-based control plane network functions and conceptual interaction. Based on the 5G system architecture, a UPF is separated from a control plane function, to allow independent extensibility, evolution, and flexible deployment. For example, a centralized manner or a distributed manner may be selected for use.

Figure 1A:
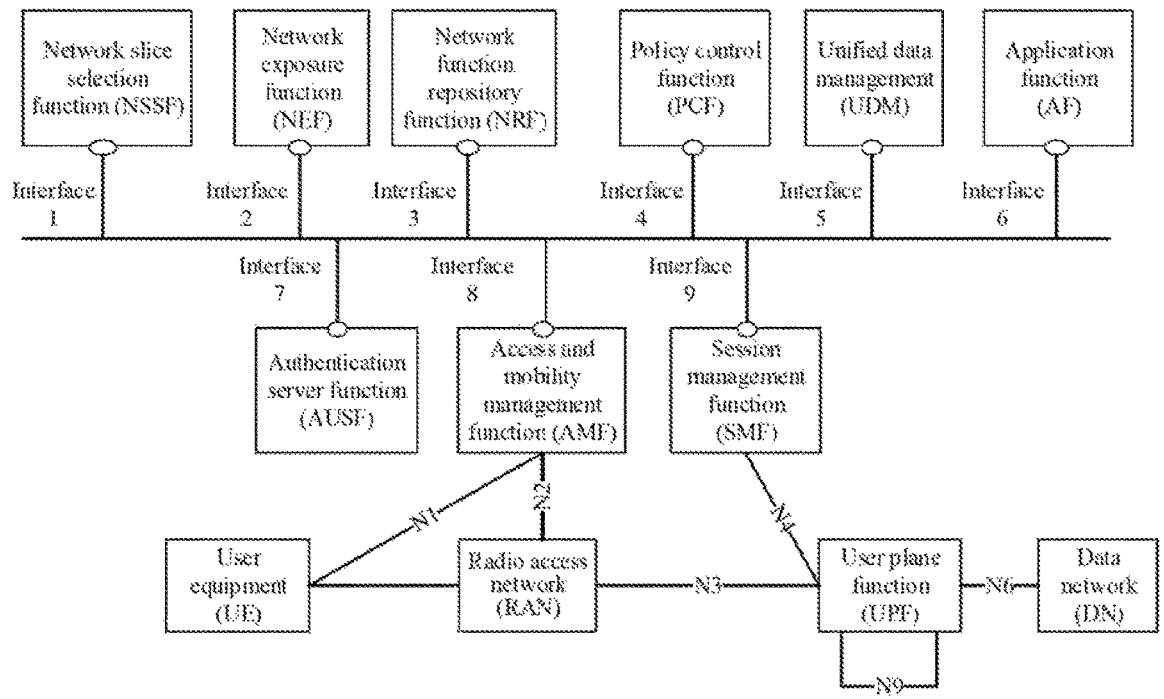
FIG. 1A is a schematic architectural diagram of a 5G system according to an embodiment of this application.
Figure 1B:
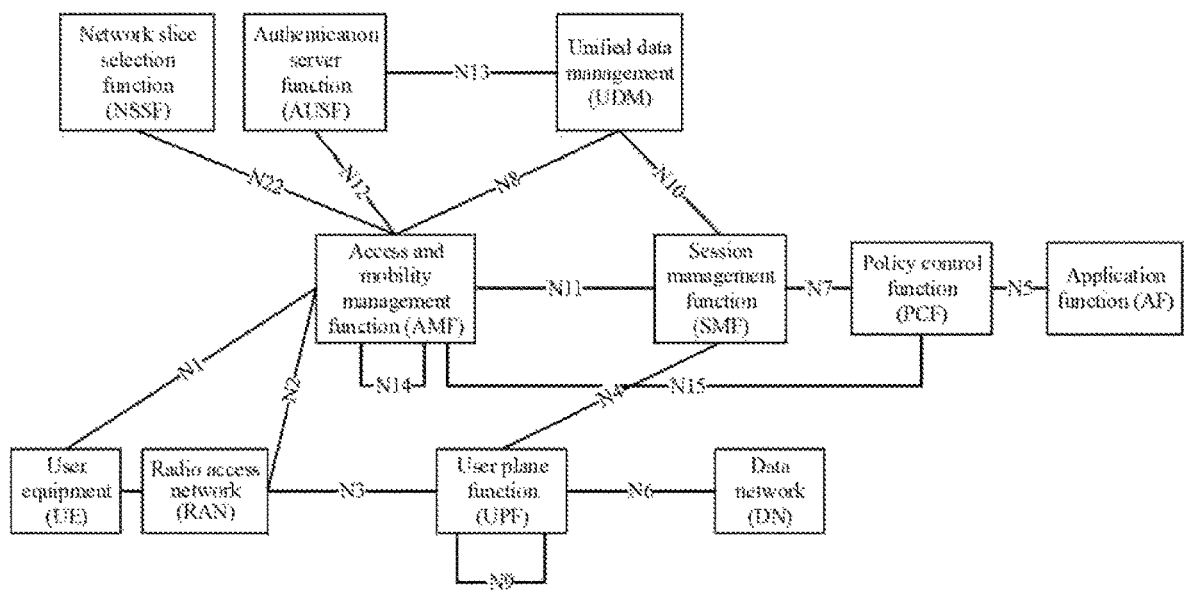
FIG. 1B is another schematic architectural diagram of a 5G system according to an embodiment of this application.

For ease of understanding, refer to FIG. 1A and FIG. 1B. FIG. 1A is a schematic architectural diagram of a 5G system according to an embodiment of this application. NF entities on a control plane communicate with each other based on a service-based interface. FIG. 1B is another schematic architectural diagram of a 5G system according to an embodiment of this application. NF entities on a control plane communicate with each other in a point-to-point manner. FIG. 1A is specifically a diagram of a 5G system architecture based on a service-based interface in a non-roaming case. FIG. 1B specifically shows a 5G system architecture using a reference point in a non-roaming case. In actual applications, there are a plurality of different scenarios, for example, a case in which UE uses a plurality of protocol data unit (PDU) sessions in a non-roaming condition to simultaneously access two data networks, and a case in which UE uses a single PDU session in a non-roaming condition to simultaneously access two data networks, which are not listed one by one herein. The 5G system architecture defines at least the following NF entities:

UE;

a (radio) access network ((R)AN);

an access and mobility management function (AMF) entity;

a UPF entity;

an authentication server function (AUSF) entity;

a data network (DN);

a network exposure function (NEF) entity;

an NF repository function (NRF) entity;

a network slice selection function (NSSF) entity;

a policy control function (PCF) entity;

an SMF entity;

a unified data management (UDM) entity;

a unified data repository (UDR) entity; and an application function (AF) entity;

Based on a service-based architecture, a network element function entity related to the control plane can authorize another network element to access services of the network element function entity. The 5G system architecture includes the following service-based interfaces:

an interface 1 (Nnssf), a service-based interface exhibited by an NSSF entity;

an interface 2 (Nnef), a service-based interface exhibited by an NEF entity;

an interface 3 (Nnrf), a service-based interface exhibited by an NRF entity;

an interface 4 (Npcf), a service-based interface exhibited by a PCF entity;

an interface 5 (Nudm), a service-based interface exhibited by an UDM entity;

an interface 6 (Naf), a service-based interface exhibited by an AF entity;

an interface 7 (Nausf), a service-based interface exhibited by an AUSF entity;

an interface 8 (Namf), a service-based interface exhibited by an AMF entity; and an interface 9 (Nsmf), a service-based interface exhibited by an SMF entity.

The 5G system architecture may further include an Nudr interface, that is, a service-based interface exhibited by a UDR entity, an Nudsf interface, that a service-based interface exhibited by a UDSF entity, and an N5g-eir interface, that is, a service-based interface exhibited by 5G-Equipment identity Register (EIR).

The 5G architecture defines at least the following reference points:

N1, which is a reference point between UE and an AMF entity;

N2, which is a reference point between a RAN and an AMF entity;

N3, which is a reference point between a RAN and a UPF entity;

N4, which is a reference point between an SMF entity and a UPF entity;

N5, which is a reference point between a PCF entity and an AF entity;

N6, which is a reference point between a UPF entity and a DN;

N7, which is a reference point between an SMF entity and a PCF entity;

N8, a reference point between a UDM entity and an AMF entity;

N9, which is a reference point between two UPF entities; and

N10, which is a reference point between a UDM entity and an SMF entity;

N11, which is a reference point between an AMF entity and an SMF entity;

N12, which is a reference point between an AMF entity and an AUSF entity;

N13, which is a reference point between a UDM entity and an AUSF entity;

N14, which is a reference point between two AMF entities;

N15, which is a reference point between a PCF entity and an AMF entity in a non-roaming scenario, or a reference point between a PCF entity in a visited network and an AMF entity in a kerning scenario;

N16, which is a reference point between two SMF entities (in a roaming case between an SMF entity in a visited network and an SMF entity in a home network);

N22, which is a reference point between an AMF entity and an NSSF entity;

N24, which is a reference point between a PCF entity in a visited network and a PCF entity in a home network; and N27, which is a reference point between an NRF entity in a visited network and an NRF entity in a home network.

Based on the foregoing 5G system architecture, the communication method provided in this application can be applied to different scenarios. That is, an NF entity establishes a communication connection to a UPF entity by Using an N4 reference point provided by an SMF entity. The NF entity may transmit a UPF event subscription request to the SMF entity. The request includes information corresponding to a request event, and the UPF entity exposes corresponding specific information to the NF entity based on the information in the subscription request. The NF entity performs corresponding processing based on the specific information to respond to requirements in different scenarios timely.

Figures 2, 3:
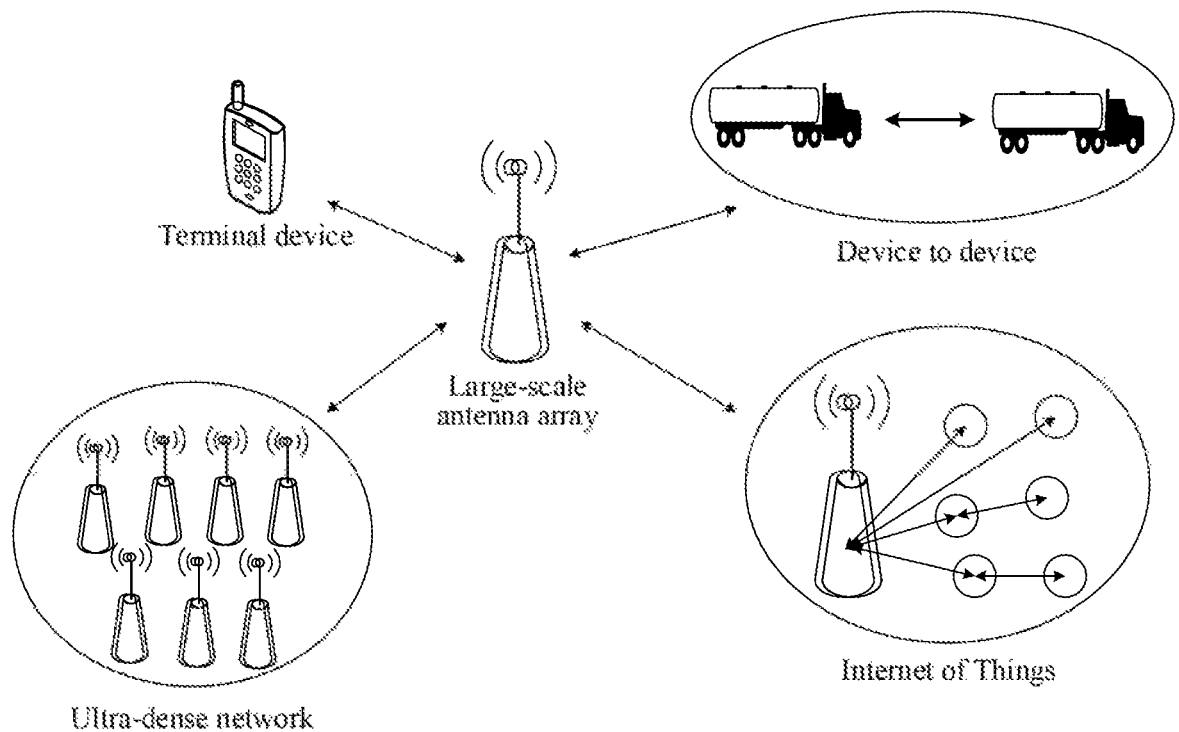
FIG. 2 is a schematic diagram of an application scenario based on a 5G system according to an embodiment of this application.
FIG. 3 is a schematic diagram of an embodiment of a communication method according to an embodiment of this application.

The scenarios include, but are not limited to, continuous wide-area coverage scenarios, high-capacity hotspot scenarios, low-power consumption and massive-connection scenarios, and low-latency high-reliability scenarios. For ease of description, refer to FIG. 2. FIG. 2 is a schematic diagram of an application scenario based on a 5G system according to an embodiment of this application, including a terminal device, device to device, a large-scale antenna array, an ultra-dense network, and a physical network. As shown in the figure, in a continuous wide-area coverage scenario, to meet a user experience rate requirement of 100 megabits per second (Mbps), in addition to requiring as many low-frequency resources as possible, the spectrum efficiency of a system also needs to be greatly improved. In a high-capacity hotspot scenario, the ultra-dense network can multiplex frequency resources more effectively, thereby greatly improving the frequency multiplexing efficiency per unit area. In a low-power consumption, massive-connection scenario, a new multiple access technology can exponentially improve the device connection capability of a system through superimposed transmission of multi-user information, and can further effectively reduce signaling overheads and terminal power consumption through scheduling-free transmission. In a low-latency high-reliability scenario, an air interface transmission latency, a network forwarding latency, and a retransmission probability need to be reduced as much as possible to meet extremely high requirements for low latency and high reliability.

With reference to the foregoing description, a communication method in this application is described from a perspective of an SMF entity. Referring to FIG. 3, an embodiment of the communication method in the embodiments of this application includes the following steps.

In step 101, an SMF entity receives a first request transmitted by an NF entity, the first request including a first ID and a second ID, the first ID indicating an event, and the second ID indicating a type of the event.

In this embodiment, based on the foregoing described 5G system architecture, it is shown that the NF entity needs to call a service of the SMF entity by using an Nsmf interface, so as to transmit the first request to the SMF entity by using the Nsmf interface. The first request needs to carry the first ID and the second ID need to be carried in. The first ID is used for indicating an event, and each event corresponds to a unique ID. The first ID may be expressed as a container ID. The second ID is used for indicating the type of the event, and may be expressed as an event type (container type), or a unique ID (container type ID) corresponding to the event type. The first ID and the second ID may be encapsulated in a container of the first request. It may be understood that, the NF entity can also store an SMF ID. The SMF ID is used for identifying an SMF entity that provides a service for subscribing to an exposed event of the UPF entity. The NF entity may be an NEF entity, an AMF entity, or the like.

For example, if the NF entity needs to request information about a load status, a first ID 000 and a second ID 111 may be carried in the first request. The first ID 000 represents an ID of an event requested this time, and the second ID 111 indicates that an event type is requesting load information. For ease of understanding, refer to Table 1. Table 1 shows a relationship between the second ID and an event type.

TABLE 1

| Second ID | Event type |
|---|---|
| 111 | Request load information of a UPF entity |
| 112 | Request an overload information notification of a UPF entity |
| 113 | Request a UPF entity to establish data information of a session |
| 115 | Request service access traffic of UE in all sessions on a UPF entity |
| 116 | Request an access rate of a single UE in a single session |
| 117 | Request service traffic information of a single UE in a single session |

It may be understood that the second IDs and the event types in Table 1 are merely an example and are not to be understood as a limitation on this application.

In step 102, the SMF entity transmits the first request to a UPF entity.

In this embodiment, after receiving the first request, the SMF entity does not need to perform any processing on the first request, and instead directly transmits the first request to the UPF entity by using an N4 reference point.

In step 103, the SMF entity receives a first response transmitted by the UPF entity, the first response including the first ID, a third ID, and a fourth ID, the third ID indicating the NF entity, and the fourth ID indicating a request result of the event.

In this embodiment, the UPF entity performs authentication on the first request according to the first request transmitted by the SMF entity, and then returns the first response, or may directly generate the first response according to the first request. The UPF entity transmits the first response to the SMF entity. The first response includes the first ID, the third ID, and the fourth ID. The third ID is used for indicating the NF entity. A target NF entity can be determined based on the third ID. The target NF entity may be the NF entity that initiates the request to the UPF entity. The fourth ID is used for indicating the request result of the event. The request result includes successfully subscribing to the event of the UPF entity or failing to subscribe to the event of the UPF entity. For example, if the fourth ID is 1, it indicates that the NF entity has successfully subscribed to the event of the UPF entity. If the fourth ID is 0, it indicates that the NF entity fails to subscribe to the event of the UPF entity. It may be understood that the fourth ID may alternatively be represented by another ID. This is merely an example herein and is not to be understood as a limitation on this application.

In step 104, the SMF entity transmits the first response to the NF entity.

In this embodiment, the SMF entity transmits the first response to the NF entity, so that the NF entity can determine whether an event provided by the UPF entity is successfully subscribed to currently. If the event is successfully subscribed to, the NF entity subsequently receives specific event information transmitted by the UPF entity by using the SMF entity.

Figure 4:
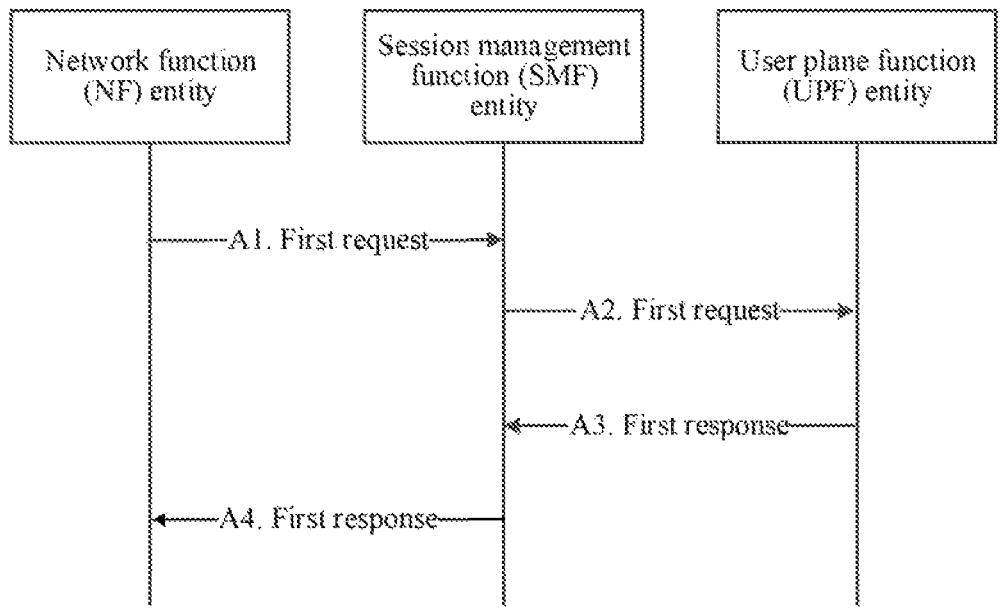
FIG. 4 is a schematic interaction flowchart of signing up for event subscription according to an embodiment of this application.

For ease of understanding, refer to FIG. 4. FIG. 4 is a schematic interaction flowchart of signing up for event subscription according to an embodiment of this application. As shown in the figure, in step A1, an NF entity on a control plane transmits a first request to an SMF entity.

The first request may be referred to as a UPF event subscription request. A first ID (that is, an ID for subscribing to an exposed event of a UPF entity) and a UPF ID are carried in the first request. The first ID is used for identifying an event, and the event is generally identified by using an ID.

If the event is an event corresponding to the UPF entity, the NF entity may find, by using an NRF entity, at least one SMF entity that can access the UPF entity. It may be understood that the UPF entity is an object that responds to the request event. If the NF entity finds, by using the NRF entity, only one SMF entity that can access the UPF entity, the NF entity directly transmits the first request to the SMF entity. If the NF entity finds, by using the NRF entity, a plurality of SMF entities that can access the UPF entity, the NF entity may transmit the first request to the plurality of SMF entities simultaneously. After receiving the first requests transmitted by the plurality of SMF entities, the UPF entity may aggregate the first requests. Optionally, if the NF entity finds, by using the NRF entity, a plurality of SMF entities that can access the UPF entity, the NF entity may alternatively randomly select on SMF entity. Optionally, if the NF entity finds, by using the NRF entity, a plurality of SMF entities that can access the UPF entity, the NF entity may alternatively select one SMF entity from the plurality of SMF entities according to a priority. Considerations of the priority include, but are not limited to, a communication distance between the NF entity and the SMF entity, a quantity of historical connections, and manually preset conditions. This is not limited herein.

If the event is an event corresponding to UE or an event corresponding to a specific session of UE, the NF entity may find the SMF entity that can access the UPF entity, by accessing a UDM entity, an SMF entity and/or a UPF entity that serve the UE or the session.

The first request may further include other information. The other information may be one or more of a preset event start time, a preset event end time, a preset quantity of event occurrences, a preset time threshold, an N4 session ID, a UPF ID, and a UE ID. This is not limited herein.

In step A2, the SMF entity transparently transmits the first request to a UPF entity.

Optionally, the first request may further include an NF ID of the NF entity. Optionally, the UPF entity may store an SMF ID that transmitted the first request, the SMF ID being an ID of the SMF entity.

In step A3, the UPF entity returns a first response to event subscription to the SMF entity.

The first response includes the first ID (that is, the ID for subscribing to the exposed event of the UPF entity), the third. ID (the NF ID), and the fourth ID (an ID, indicating whether the event subscription is successful). If the UPF entity supports the first request, the UPF entity returns the fourth ID in the first response to indicate that the event subscription succeeds. Otherwise, if the UPF entity does not support the first request, the UPF entity returns the fourth ID in the first response to indicate that the event subscription fails. Optionally, the first response may further include a failure cause value.

In step A4, the SMF entity transparently transmits the first response to the NF entity.

In the embodiments of this application, a communication method for exposing a user plane event is provided. First, an SMF entity receives a first request transmitted by an NF entity. The first request includes a first ID and a second ID. The SMF entity then transmits the first request to a UPF entity, and the SMF entity receives a first response transmitted by the UPF entity. The first response includes the first ID, a third ID, and a fourth ID. Finally, the SMF entity transmits the first response to the NF entity. In the foregoing manner, the NF entity may initiate an event subscription request to the UPF entity by using the SMF entity, so that the UPF entity transmits a response to the NF entity based on the request by using the SMF entity, thereby exposing a UPF event to the NF entity. In this way, the NF entity can perceive information on a user plane, and further perform operations, such as policy control, based on the information on the user plane.

Optionally, based on the embodiments corresponding to FIG. 3, in an embodiment of the communication method, after the SMF entity transmits the first response to the NF entity, the method may further include the following steps: receiving, by the SMF entity, a second request transmitted by the NF entity, the second request including the first ID and event update information. The method may further include transmitting, by the SMF entity, the second request to the UPF entity, and receiving, by the SMF entity, a second response transmitted by the UPF entity, the second response including the first ID, the third ID, and a fifth ID, the fifth ID indicating an update request result of the event; if the UPF entity supports the second request, returning the fifth ID in the second response to indicate an update request success; otherwise, if the UPF entity does not support the second request, returning the fifth ID in the second response to indicate an update request failure, where optionally, the second response may further include a failure cause value. The method may further include transmitting, by the SMF entity, the second response to the NF entity.

In this embodiment, a communication method for updating a user plane event is described. That is, after an NF entity successfully subscribes to an event of a UPF entity, the NF entity may transmit a second request to an SMF entity by using an Nsmf interface. The second request needs to include a first ID, a second ID, and event update information. The first ID herein is used for indicating the event, and each event corresponds to a unique ID. The second ID is used for indicating a type of the event. The event update information includes event information that needs to be updated, and includes, but is not limited to, an updated event start time, an updated event end time, an updated quantity of event occurrences, and an updated event threshold.

The SMF entity does not need to process the second request, and directly transmits the second request to the UPF entity. The UPF entity performs authentication on the second request according to the second request transmitted by the SMF entity, and returns a second response, or may directly generate the second response according to the second request. The UPF entity transmits the second response to the SMF entity. The second response includes the first ID, a third ID, and a fifth ID. The third ID is used for indicating the NF entity. A target NF entity can be determined based on the third ID. The target NF entity may be the NF entity that initiates the request to the UPF entity. The fifth ID is used for indicating an update request result of the event, and the update request result includes an update request success or an update request failure. For example, if the fifth ID is 1, it indicates that event information that needs to be updated has been updated successfully. If the fifth ID is 0, it indicates that event information that needs to be updated is not updated successfully. It may be understood that the fifth ID may alternatively be represented by another ID. This is merely an example herein and is not to be understood as a limitation on this application.

Figure 5:
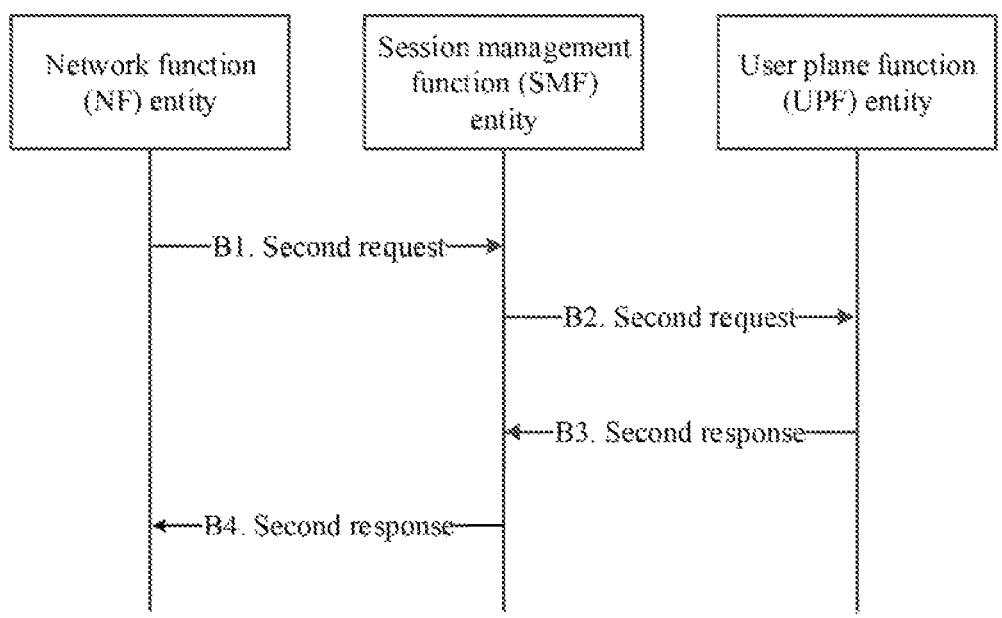
FIG. 5 is a schematic interaction flowchart of updating a subscribed event according to an embodiment of this application.

For ease of understanding, refer to FIG. 5. FIG. 5 is a schematic interaction flowchart of updating a subscribed event according to an embodiment of this application. As shown in the figure, after an NF entity subscribes to an event of a UPF entity, if the NF entity further needs to update the event, for example, update threshold information of the UPF event, the NF entity needs to initiate a UPF event subscription update process, or trigger a PDU session update process.

In step B1, after the NF entity subscribes to a specific UPF event, if the NF entity needs to update information of the event, the NF entity needs to transmit a second request (that is, a UPF event subscription update request) to an SMF entity.

The second request includes a first ID (that is, an ID for subscribing to an exposed event of the UPF entity), a UPF ID, and event update information (that is, event information that needs to be updated). It may be understood that the first ID, the UPF ID, and the event update information can be encapsulated in a container of the second request.

In step B2, the SMF entity transparently transmits the second request to the UPF entity, the second request including an ID of the NF entity.

In step B3, the UPF entity returns a second response to an event subscription update to the SMF entity.

The second response includes the first ID (that is, the ID for subscribing to the exposed event of the UPF entity), a third ID (an NF ID), and a fifth ID (an ID indicating whether the subscribed event update is successful). If the UPF entity supports the second request, the UPF entity returns the fifth ID in the second response to indicate an update request success. Otherwise, if the UPF entity does not support the second request, the UPF entity returns the fifth ID in the second response to indicate tan update request failure. Optionally, the second response may further include a failure cause value.

In step B4, the SMF entity transparently transmits the second response to the NF entity.

In this embodiment of this application, a communication method for updating a user plane event is provided. First, an SMF entity receives a second request transmitted by an NF entity, and then the SMF entity transmits the second request to a UPF entity. The UPF entity transmits a second response to the SMF entity according to the second request. The SMF entity transmits the second response to the NF entity. In the foregoing manner, the NF entity may initiate an event subscription update request to the UPF entity by using the SMF entity, so that the UPF entity transmits a response to the NF entity based on the request by using the SMF entity, thereby updating a subscribed event, and so that NF entity can more flexibly adjust to-be-obtained content that the subscribed event.

Optionally, based on the embodiments corresponding to FIG. 3, in an embodiment of the communication method, after the SMF entity transmits the first response to the NF entity, the method may further include the following steps: receiving, by the SMF entity, a third request transmitted by the NF entity, the third request including the first ID, and transmitting, by the SMF entity, the third request to the UPF entity. The method may further include receiving, by the SMF entity, a third response transmitted by the UPF entity, the third response including the first ID and the third ID, and transmitting, by the SMF entity, the third response to the NF entity.

In this embodiment, a communication method for unsubscribing from a user plane event is described. That is, after an NF entity successfully subscribes to an event of a UPF entity, the NF entity may transmit a third request to an SMF entity by using an Nsmf interface. The third request needs to include a first ID. The first ID herein is used for indicating the event, and each event corresponds to a unique ID. The SMF entity does not need to process the third request, and directly transmits the third request to the UPF entity. The UPF entity performs authentication on the third request according to the third request transmitted by the SMF entity, and returns a third response, or may directly generate the third response according to the third request. The UPF entity transmits the third response to the SMF entity. The third response includes the first ID and a third ID. The third ID is used for indicating the NF entity. A target NF entity can be determined based on the third ID. The target NF entity may be the NF entity that initiates the request to the UPF entity.

Figure 6:
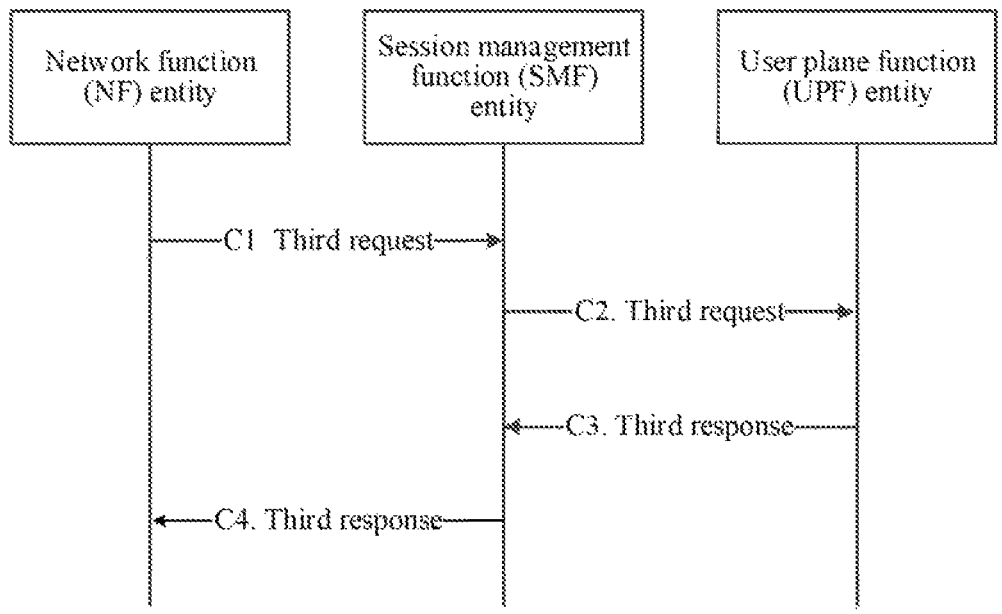
FIG. 6 is a schematic interaction flowchart of unsubscribing from a subscribed event according to an embodiment of this application.

For ease of understanding, refer to FIG. 6. FIG. 6 is a schematic interaction flowchart of unsubscribing from a subscribed event according to an embodiment of this application. As shown in the figure, after an NF entity subscribes to an event of a UPF entity, if the NF entity needs to unsubscribe from the event, the NF entity needs to initiate a UPF event subscription cancellation process, or trigger a PDU session subscription cancellation process.

In step C1, after the NF entity subscribes to an event of a specific UPF, if the NF entity needs to unsubscribe from the event, the NF entity needs to transmit a third request (that is, a UPF event subscription cancellation request) to an SMF entity, which is implemented by calling a service of the SMF entity.

The third request includes a first ID (that is, an ID for subscribing an exposed event of the UPF entity), and may further include a UPF ID. It may be understood that the first ID and the UPF ID may be encapsulated in a container of the third request.

In step C2, the SMF entity transparently transmits the third request to a UPF entity.

In step C3, the UPF entity returns a third response to event subscription cancellation to the SMF entity, the third response including the first ID (that is, the ID for subscribing the exposed event of the UPF entity) and a third ID (an NF ID).

In step C4, the SMF entity transparently transmits the third response to the NF entity.

Further, in this embodiment of this application, a communication method for unsubscribing from a user plane event is provided. First, an SMF entity receives a third request transmitted by an NF entity, and then the SMF entity transmits the third request to a UPF entity. The SMF entity receives a third response transmitted by the UPF entity and transmits the third response to the NF entity. In the foregoing manner, the NF entity may initiate an event subscription cancellation request to the UPF entity by using the SMF entity, so that the UPF entity transmits a response to the NF entity based on the request by using the SMF entity, thereby unsubscribing from a subscribed event. In this way, the NF entity can timely unsubscribe from the subscribed event, so as to save transmission resources.

Optionally, based on the embodiments corresponding to FIG. 3, in an embodiment of the communication method, after the SMF entity transmits the first response to the NF entity, the method may further include the following steps: receiving, by the SMF entity, a message transmitted by the UPF entity, the message including the first ID, the second ID, and event information corresponding to the first request, and transmitting, by the SMF entity, a message to the NF entity.

In this embodiment, a communication method for implementing user plane event notification is described. That is, after an NF entity subscribes to an event of a UPF entity, the UPF entity may obtain the event requested in a first request according to the first request, and obtain specific event information of the event. Next, the UPF entity first transmits a message including the specific event information to an SMF entity. The message further needs to carry a first ID and a second ID in addition to event information corresponding to the first request. After receiving the message, the SMF entity can transmit the message to the NF entity.

Figure 7:
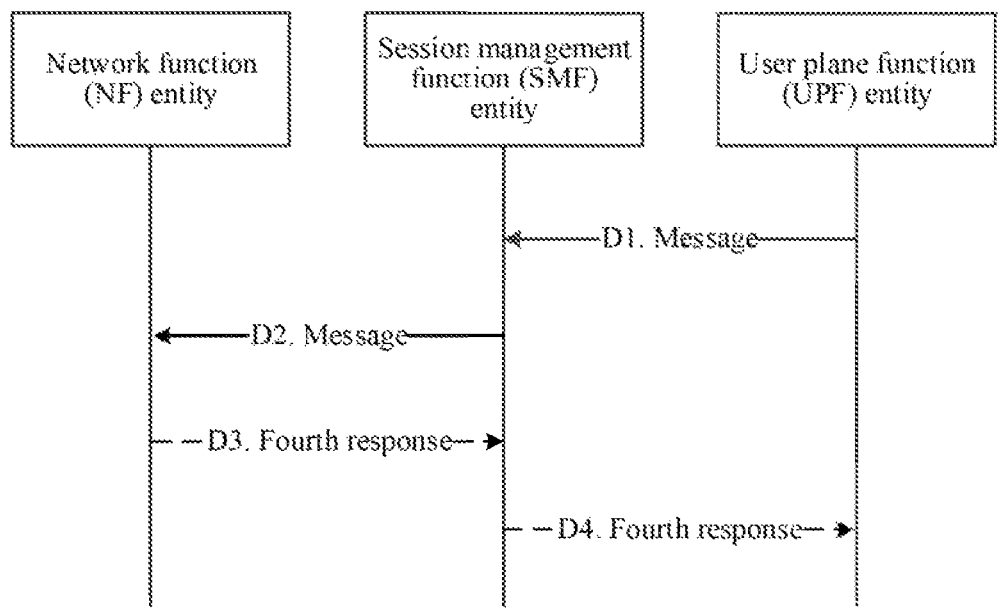
FIG. 7 is a schematic interaction flowchart of notification of a subscribed event according to an embodiment of this application.

For ease of understanding, refer to FIG. 7. FIG. 7 is a schematic interaction flowchart of notification of a subscribed event according to an embodiment of this application. As shown in the figure, when a UPF entity detects that a subscribed event occurs, the UPF entity initiates a UPF event exposing process to an NF entity that subscribes to the event.

In step D1, after the NF entity subscribes to an event of a specific UPF, when the UPF entity detects that a subscribed event occurs, the UPF entity triggers a message (that is, a UPF event notification) to an SMF entity.

The SMF entity is an SMF entity that stores an SMF ID when the UPF entity receives a first request (that is, a UPF event subscription request). The message is transmitted in the form of a container. The container needs to include a first ID (that is, an ID for subscribing to an exposed event of the UPF entity), and may include a second ID (a type of the UPF event). The container may further include information such as a UE ID, an N4 session ID, an event start time, an event end time, and a quantity of event occurrences. Optionally, in addition to the container, the UPF entity also transmits a third ID (an NF ID) to the SMF entity.

In step D2, the SMF entity transparently transmits the message to the NF entity, the NF entity being a target NF entity.

Optionally, in step D3, after the NF entity receives the message, the NF entity may transmit a response message to the SMF entity.

Optionally, in step D4, the SMF entity transparently transmits the response message to the UPF entity.

Further, in this embodiment of this application, a communication method for implementing UPF event notification is provided. First, an SMF entity receives a message transmitted by a UPF entity, and then the SMF entity transmits the message to an NF entity. In the foregoing manner, after the NF entity successfully subscribes to an event, the NF entity can receive, by using the SMF entity, a message fed back by the UPF entity, so as to obtain specific event information corresponding to the subscribed event, thereby improving the feasibility and operability of the solution.

Optionally, based on the embodiments corresponding to FIG. 3, in an embodiment of the communication method, the event information includes information corresponding to a UPF; or the event information includes information corresponding to UE; or the event information includes information corresponding to a single session of a single UE.

In this embodiment, the event information is classified into three types of information: the information corresponding to the UPF entity, the information corresponding to the UE, and the information corresponding to the single session of the single UE.

For the first request transmitted by the NF entity to the UPF entity by using the SMF entity, if the second ID carried in the first request indicates that the event type is "Request load information of a UPF entity", it is determined that event information requested in the first request is the information corresponding to the UPF entity.

If the second ID carried in the first request indicates that the event type is "Request an overload notification of a UPF entity", it is determined that the event information requested in the first request is the information corresponding to the UPF entity.

If the second ID carried in the first request indicates that the event type is "Request a UPF entity to establish data information of a session", it is determined that the event information requested in the first request is the information corresponding to the UPF entity.

If the second ID carried in the first request indicates that the event type is "Request service access traffic of UE in all sessions on a UPF entity", it is determined that the event information requested in the first request is the information corresponding to the UE.

If the second ID carried in the first request indicates that the event type is "Request an access rate of a single UE in a single session", it is determined that the event information requested in the first request is the information corresponding to the single session of the single UE.

If the second ID carried in the first request indicates that the event type is "Request service traffic information of a single UE in a single session", it is determined that the event information requested in the first request is the information corresponding to the single session of the single UE.

It may be understood that the correspondences between the event type and event information granularities are merely an example. In an actual application, relationships between different event types and event information granularities may be further defined, and different event types and different event information granularities may also be defined. This is merely an example and is not to be understood as a limitation on this application.

Optionally, based on the embodiments corresponding to FIG. 3, in an embodiment of the communication method, the first request further includes a UPF ID and the third ID. The first request further includes one or more of an average value, a maximum value, an event start time, an event end time, and a quantity of event occurrences. Alternatively, the first request further includes a UE ID or a UE group ID, the first request further includes at least one UPF ID and the third ID, the UPF ID indicating the UPF entity, and the first request further includes one or more of an average value, a maximum value, an event start time, an event end time, and a quantity of event occurrences. As another alternative, the first request further includes a UE ID, a UPF ID, the third ID, and a session ID, and the first request further includes one or more of an average value, a maximum value, an event start time, an event end time, and a quantity of event occurrences.

In this embodiment, information that can be carried in the first request based on different requirements is described. Assuming that the event information requested in the first request is load information corresponding to the UPF entity, information shown in Table 2 may be further carried in the first request.

TABLE 2

| Information included in first request | Preset information content | Information necessity degree |
|---|---|---|
| UPF ID | 00001 | Mandatory |
| Third ID (that is, NF ID) | 01010 | Mandatory |
| Average value | | Optional |
| Maximum value | | Optional |
| Event start time | 1569039329570 | Optional |
| Event end time | 1569039346783 | Optional |

Based on the content in Table 2, it is shown that the UPF entity may carry the following event information in a message fed back to the NF entity. Table 3 shows message content transmitted by the UPF entity to the NF entity by using the SMF entity.

TABLE 3

| Event information included in message | Event information content | Information necessity degree |
|---|---|---|
| UPF ID | 00001 | Mandatory |
| Third ID (that is, NF ID) | 01010 | Mandatory |
| Average value | XXXX | Optional |
| Maximum value | XXXX | Optional |
| Event start time | 1569039329570 | Optional |
| Event end time | 1569039346783 | Optional |

Based on the content of Table 2 and Table 3, it is shown that the UPF entity feeds back a corresponding message according to specific information requested in the first request, and adds requested event information in the message.

Assuming that the event information requested in the first request is traffic information corresponding to the UE, information shown in Table 4 may be further carried in the first request.

TABLE 4

| Information included in first request | Preset information content | Information necessity degree |
|---|---|---|
| UE ID or UE group ID | 111111 or 010 | Mandatory |
| (At least one) UPF ID | 11001 | Mandatory |
| Third ID (that is, NF ID) | 01010 | Mandatory |
| Total traffic | | Optional |
| Event start time | 1569039329570 | Optional |
| Event end time | 1569039346783 | Optional |

There may be one or more UPF IDs. If there are a plurality of UPF IDs, UPF IDs respectively corresponding to the UPF entities are carried in the first request. Based on the content in Table 4, it is shown that the UPF entity may carry the following event information in a message fed back to the NF entity. Table 5 shows message content transmitted by the UPF entity to the NF entity by using the SMF entity.

TABLE 5

| Event information included in message | Event information content | Information necessity degree |
|---|---|---|
| UE ID or UE group ID | 111111 or 010 | Mandatory |
| (At least one) UPF ID | 11001 | Mandatory |
| Third ID (that is, NF ID) | 01010 | Mandatory |
| Total traffic | 50 megabytes | Optional |
| Event start time | 1569039346783 | Optional |
| Event end time | 1569039346783 | Optional |

Based on the content of Table 4 and Table 5, it is shown that the UPF entity feeds back a corresponding message according to specific information requested in the first request, and adds requested event information in the message.

Assuming that the event information requested in the first request is a rate of a single session of a single UE, information shown in Table 6 may be further carried in the first request.

TABLE 6

| Information included in first request | Preset information content | Information necessity degree |
|---|---|---|
| UE ID | 111111 | Mandatory |
| UPF ID | 11001 | Mandatory |
| Third ID (that is, NF ID) | 01010 | Mandatory |
| Average value | | Optional |
| Maximum value | | Optional |
| Event start time | 1569039329570 | Optional |
| Event end time | 1569039346783 | Optional |

Based on the content in Table 6, it is shown that the UPF entity may carry the following event information in a message fed back to the NF entity. Table 7 shows message content transmitted by the UPF entity to the NF entity by using the SMF entity.

TABLE 7

| Event information included in message | Event information content | Information necessity degree |
|---|---|---|
| UE ID | 111111 | Mandatory |
| UPF ID | 11001 | Mandatory |
| Third ID (that is, NF ID) | 01010 | Mandatory |
| Average value | 35 megabytes per second | Optional |
| Maximum value | 78 megabytes per second | Optional |
| Event start time | 1569039329570 | Optional |
| Event end time | 1569039346783 | Optional |

Based on the content of Table 6 and Table 7, it is shown that the UPF entity feeds back a corresponding message according to specific information requested in the first request, and adds requested event information in the message.

It may be understood that the information included in the first request and the preset information content are merely an example and are not to be understood as a limitation on this application.

Further, information that may be carried in the first request based on different requirements is provided in this embodiment of this application. In the foregoing manner, the NF entity can request accurate event information from the UPF entity, which is beneficial to the feasibility and operability of the solution.

Figure 8:
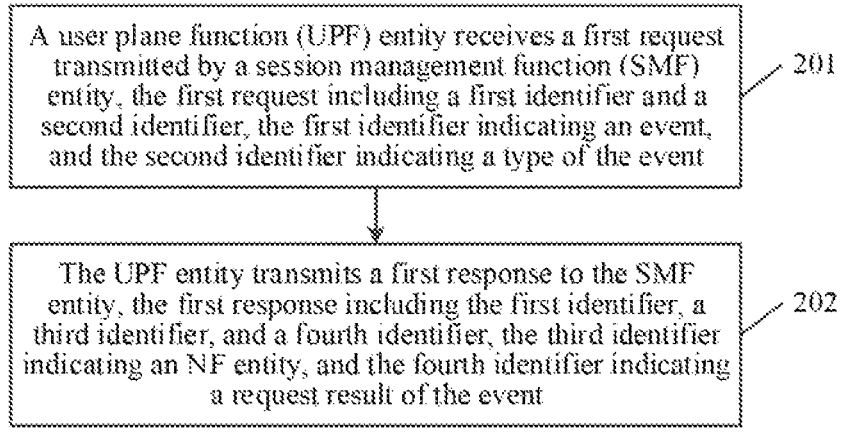
FIG. 8 is a schematic diagram of another embodiment of a communication method according to an embodiment of this application.

With reference to the foregoing description, a communication method in this application is described from a perspective of a UPF entity. Referring to FIG. 8, an embodiment of the communication method in the embodiments of this application includes the following steps.

In step 201, a UPF entity receives a first request transmitted by an SMF entity, the first request including a first ID and a second ID, the first ID indicating an event, and the second ID indicating a type of the event.

In this embodiment, an NF entity first transmits the first request to the SMF entity by using an Nsmf interface. The first request needs to carry the first ID and the second ID. The first ID is used for indicating the event, and each event corresponds to a unique ID. The first ID may be expressed as a container ID. The second ID is used for indicating the type of the event. Each event type corresponds to a unique ID. The second ID may be expressed as a container type or a container type ID. For a correspondence between the second ID and an event type, reference may be made to the embodiments corresponding to FIG. 3. Details are not described herein again.

After receiving the first request, the SMF entity does not need to perform any processing on the first request, and instead directly transmits the first request to the UPF entity by using an N4 reference point. In this way, the UPF entity receives the first request transmitted by the SMF entity.

In step 202, the UPF entity transmits a first response to the SMF entity, the first response including the first ID, a third ID, and a fourth ID, the third ID indicating the NF entity, and the fourth ID indicating a request result of the event.

In this embodiment, the UPF entity performs authentication on the first request according to the first request transmitted by the SMF entity, and then returns the first response, or may directly generate the first response according to the first request. The UPF entity transmits the first response to the SMF entity. The SMF entity does not need to process the first response, and directly transmits the first response to the NF entity. The NF entity can determine, according to the first response, whether an event provided by the UPF entity is successfully subscribed to currently. If the event is successfully subscribed to, the NF entity subsequently receives specific event information transmitted by the UPF entity by using the SMF entity.

For interaction processes among the NF entity, the SMF entity, and the UPF entity, reference may be made to the embodiment corresponding to FIG. 4. Details are not described herein again.

In the embodiments of this application, a communication method for exposing a user plane event is provided. First, an SMF entity receives a first request transmitted by an NF entity. The first request includes a first ID and a second ID. The SMF entity then transmits the first request to a UPF entity, and the SMF entity receives a first response transmitted by the UPF entity. The first response includes the first ID, a third ID, and a fourth ID. Finally, the SMF entity transmits the first response to the NF entity. In the foregoing manner, the NF entity may initiate an event subscription request to the UPF entity by using the SMF entity, so that the UPF entity transmits a response to the NF entity based on the request by using the SMF entity, thereby exposing a UPF event to the NF entity. In this way, the NF entity can perceive information on a user plane, and further perform operations, such as policy control, based on the information on the user plane.

Optionally, based on the embodiments corresponding to FIG. 8, in an embodiment of the communication method, after the UPF entity transmits the first response to the SMF entity, the method may further include the following steps: receiving, by the UPF entity, a second request transmitted by the SMF entity, the second request being transmitted by the NF entity to the SMF entity, and the second request including the first ID, the second ID, and event update information, and transmitting, by the UPF entity, a second response to the SMF entity, the second response including the first ID, the third ID, and a fifth ID, the fifth ID indicating an update request result of the event.

In this embodiment, a communication method for updating a user plane event is described. For a specific implementation, reference may be made to the embodiment corresponding to FIG. 3. For interaction processes among an NF entity, an SMF entity, and a UPF entity, reference may be made to the embodiment corresponding to FIG. 5. Details are not described herein again.

Further, in this embodiment of this application, a communication method for updating a user plane event is provided. In the foregoing manner, an NF entity may initiate an event subscription update request to a UPF entity by using an SMF entity, so that the UPF entity transmits a response to the NF entity based on the request by using the SMF entity, thereby updating a subscribed event, so that the NF entity can more flexibly adjust to-be-obtained content of the subscribed event.

Optionally, based on the embodiments corresponding to FIG. 8, in an embodiment of the communication method, after the UPF entity transmits the first response to the SMF entity, the method may further include the following steps: receiving, by the UPF entity, a third request transmitted by the SMF entity, the third request being transmitted by the NF entity to the SMF entity, and the third request including the first ID and the second ID, and transmitting, by the UPF entity, a third response to the SMF entity, the third response including the first ID and the third ID.

In this embodiment, a communication method for unsubscribing from a user plane event is described. For a specific implementation, reference may be made to the embodiment corresponding to FIG. 3. For interaction processes among an NF entity, an SMF entity, and a UPF entity, reference may be made to the embodiment corresponding to FIG. 6. Details are not described herein again.

Further, in this embodiment of this application, a communication method for unsubscribing from a user plane event is provided. In the foregoing manner, an NF entity may initiate an event subscription cancellation request to a UPF entity by using an SMF entity, so that the UPF entity transmits a response to the NF entity based on the request by using the SMF entity, thereby unsubscribing from a subscribed event. In this way, the NF entity can timely unsubscribe from the subscribed event, so as to save transmission resources.

Optionally, based on the embodiments corresponding to FIG. 8, in an embodiment of the communication method, after the UPF entity transmits the first response to the SMF entity, the method may further include transmitting, by the UPF entity, a message to the SMF entity, the message including the first ID, the second ID, and event information corresponding to the first request.

In this embodiment, a communication method for implementing user plane event notification is described. For a specific implementation, reference may be made to the embodiment corresponding to FIG. 3. For interaction processes among an NF entity, an SMF entity, and a UPF entity, reference may be made to the embodiment corresponding to FIG. 7. Details are not described herein again.

Further, in this embodiment of this application, a communication method for implementing UPF event notification is provided. First, an SMF entity receives a message transmitted by a UPF entity, and then the SMF entity transmits the message to an NF entity. In the foregoing manner, after the NF entity successfully subscribes to an event, the NF entity can receive, by using the SMF entity, a message fed back by the UPF entity, so as to obtain specific event information corresponding to the subscribed event, thereby improving the feasibility and operability of the solution.

Figure 9:
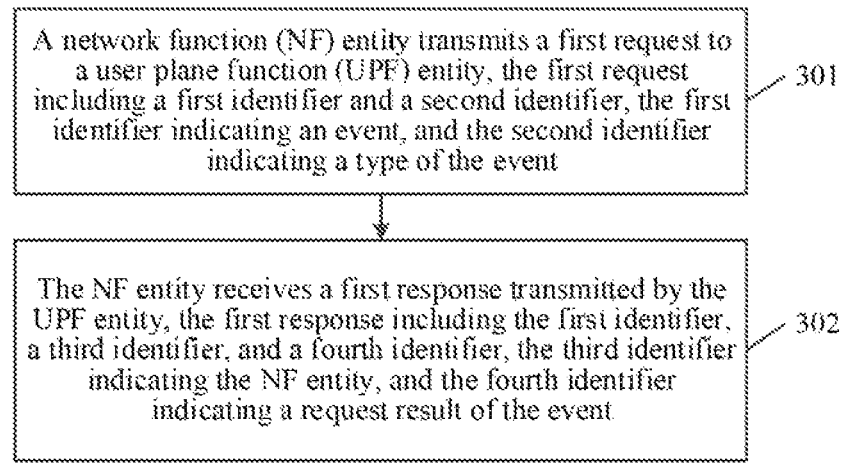
FIG. 9 is a schematic diagram of another embodiment of a communication method according to an embodiment of this application.

With reference to the foregoing description, a communication method in this application is described from a perspective of an NF entity. Referring to FIG. 9, an embodiment of the communication method in the embodiments of this application includes the following steps.

In step 301, an NF entity transmits a first request to a UPF entity, the first request including a first ID and a second ID, the first ID indicating an event, and the second ID indicating a type of the event.

In this embodiment, based on an evolved communication system architecture, when the UPF entity exposes an interface for direct communication with the NF entity, the NF entity may transmit the first request to the UPF entity by using the interface. The first request needs to carry the first ID and the second ID. The first ID herein is used for indicating an event, and each event corresponds to a unique ID. The first ID may be expressed as a container ID. The second ID is used for indicating the type of the event. Each event type corresponds to a unique ID. The second ID may be represented as an event type (container type), or a unique ID (container type ID) corresponding to the event type. The first ID and the second ID may be encapsulated in a container of the first request. For a correspondence between the second ID and an event type, reference may be made to the embodiments corresponding to FIG. 3. Details are not described herein again.

In step 302, the NF entity receives a first response transmitted by the UPF entity, the first response including the first ID, a third ID, and a fourth ID, the third ID indicating the NF entity, and the fourth ID indicating a request result of the event.

In this embodiment, the UPF entity performs authentication on the first request and then returns the first response, or may directly generate the first response according to the first request. The UPF entity transmits the first response to the NF entity. The first response includes the first ID, the third ID, and the fourth ID. The third ID is used for indicating the NF entity. A target NF entity can be determined based on the third ID. The target NF entity may be the NF entity that initiates the request to the UPF entity. The fourth ID is used for indicating the request result of the event. The request result includes-successfully subscribing to the event of the UPF entity or failing to subscribe to the event of the UPF entity. For example, if the fourth ID is 1, it indicates that the NF entity has successfully subscribed to the event of the UPF entity. If the fourth ID is 0, it indicates that the NF entity fails to subscribe to the event of the UPF entity. It may be understood that the fourth ID may alternatively be represented by another ID. This is merely an example herein and is not to be understood as a limitation on this application.

After the UPF entity transmits the first response to the NF entity, the NF entity may determine whether an event provided by the UPF entity is successfully subscribed to currently. If the event is successfully subscribed to, the NF entity subsequently receives specific event information transmitted by the UPF entity.

Figure 10:
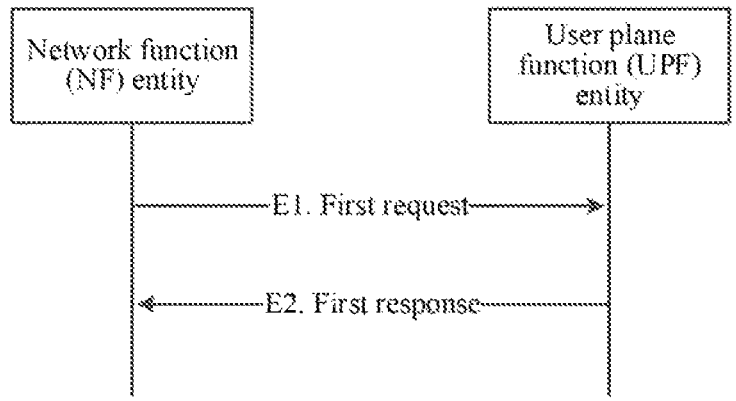
FIG. 10 is another schematic interaction flowchart of signing up for event subscription according to an embodiment of this application.

For ease of understanding, refer to FIG. 10. FIG. 10 is another schematic interaction flowchart of signing up for event subscription according to an embodiment of this application. As shown in the figure, in step E1, an NF entity on a control plane transmits a first request (that is, a UPF event subscription request) to a UPF entity.

The first request may be referred to as a UPF event subscription request. A first ID (that is, an ID for subscribing to an exposed event of the UPF event) and a UPF ID are carried in the first request. The first ID is used for identifying an event, and one event corresponds to a type of granularity. If the event is an event corresponding to a UPF granularity, the NF entity directly transmits the first request to a corresponding UPF entity. If the event is an event corresponding to a UE granularity or a session granularity, the NF entity may find, by accessing a UDM entity, a UPF entity that serves UE or a session, and then transmits the first request to the UPF entity.

The first request may further include other information. The other information may be one or more of a preset event start time, a preset event end time, a preset quantity of event occurrences, a preset time threshold, an N4 session ID, a UPF ID, and a UE ID. This is not limited herein.

In step E2, the UPF entity returns a first response to the event subscription to the NF entity.

The first response includes the first ID (that is, the ID for subscribing to the exposed event of the UPF entity), a third ID (an NF ID), and a fourth ID (an ID indicating whether the event subscription is successful). If the UPF entity supports the first request, the UPF entity returns the fourth ID in the first response to indicate that the event subscription succeeds. Otherwise, if the UPF entity does not support the first request, the UPF entity returns the fourth ID in the first response to indicate that the event subscription fails. Optionally, the first response may further include a failure cause value.

In the embodiments of this application, another communication method for exposing a UPF event is provided. An NF entity may directly transmit first request to a UPF entity. The first request includes a first ID and a second ID. The UPF entity transmits a first response to the NF entity. The first response includes the first ID, a third ID, and a fourth ID. In the foregoing manner, the NF entity may initiate an event subscription request to the UPF entity, so that the UPF entity transmits a response to the NF entity based on the request, thereby exposing a UPF event to the NF entity. In this way, the NF entity can perceive information on a user plane, and further perform operations, such as policy control, based on the information on the user plane.

Optionally, based on the embodiments corresponding to FIG. 9, in an embodiment of the communication method, after the NF entity receives the first response transmitted by the UPF entity, the method may further include the following steps: transmitting, by the NF entity, a second request to the UPF entity, the second request including the first ID and event update information; and receiving, by the NF entity, a second response transmitted by the UPF entity, the second response including the first ID, the third ID, and a fifth ID, the fifth ID indicating an update request result of the event.

In this embodiment, a communication method for updating a user plane event is described. That is, after an NF entity successfully subscribes to an event of a UPF entity, the NF entity may transmit a second request to the UPF entity by using an interface. The second request needs to include a first ID, a second ID, and event update information. The first ID herein is used for indicating the event, and each event corresponds to a unique ID. The second ID is used for indicating a type of the event. The event update information includes event information that needs to be updated, and includes, but is not limited to, an updated event start time, an updated event end time, an updated quantity of event occurrences, and an updated event threshold.

The UPF entity performs authentication on the second request according to the second request transmitted by the NF entity, and then returns a second response; or may directly generate the second response according to the second request. The UPF entity transmits the second response to the NF entity. The second response includes the first ID, a third ID, and a fifth ID. The third ID is used for indicating the NF entity. A target NF entity can be determined based on the third ID. The target NF entity may be the NF entity that initiates the request to the UPF entity. The fifth ID is used for indicating an update request result of the event, and the update request result includes an update request success or an update request failure. For example, if the fifth ID is 1, it indicates that event information that needs to be updated has been updated successfully. If the fifth ID is 0, it indicates that event information that needs to be updated is not updated successfully. It may be understood that the fifth ID may alternatively be represented by another ID. This is merely an example herein and is not to be understood as a limitation on this application.

Figure 11:
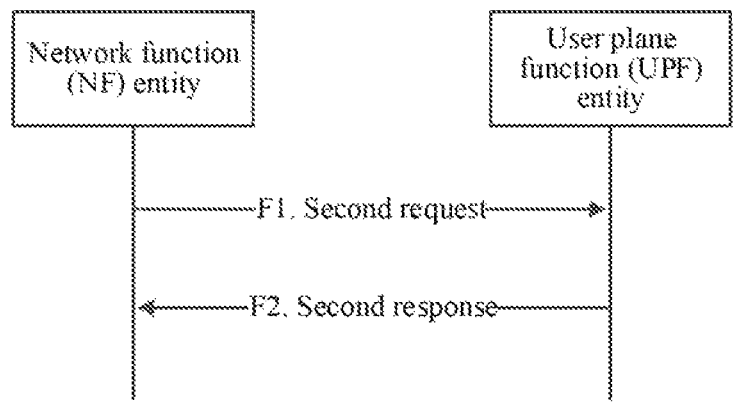
FIG. 11 is another schematic interaction flowchart of updating a subscribed event according to an embodiment of this application.

For ease of understanding, refer to FIG. 11. FIG. 11 is another schematic interaction flowchart of updating a subscribed event according to an embodiment of this application. As shown in the figure, after an NF entity subscribes to an event of a UPF entity, if the NF entity further needs to update the event, for example, update threshold information of the UPF event, the NF entity needs to initiate a UPF event subscription update process, or trigger a PDU session update process.

In step F1, after the NF entity subscribes to a specific UPF event, if the NF entity needs to update information of the event, the NF entity needs to transmit a second request (that is, a UPF event subscription update request) to a UPF entity. The second request includes a first ID (that is, an ID for subscribing to an exposed event of the UPF entity), a UPF ID, and event update information (that is, event information that needs to be updated), and may further include an ID of the NF entity. It may be understood that the first ID, the UPF ID, and the event update information can be encapsulated in a container of the second request.

In step F2, the UPF entity returns a second response of an event subscription update to the NF entity, the second response including the first ID (that is, the ID for subscribing to the UPF exposure event), a third ID (an NF ID), and a fifth ID (an ID indicating whether the subscribed event update is successful). If the UPF entity supports the second request, the UPF entity returns the fifth ID in the second response to indicate an update request success. Otherwise, if the UPF entity does not support the second request, the UPF entity returns the fifth ID in the second response to indicate tan update request failure. Optionally, the second response may further include a failure cause value.

Further, in this embodiment of this application, a communication method for updating an UPF event is provided. In the foregoing manner, an NF entity may initiate an event subscription update request to a UPF entity, so that the UPF entity transmits a response to the NF entity based on the request, thereby updating a subscribed event, so that the NF entity can more flexibly adjust to-be-obtained content of the subscribed event.

Optionally, based on the embodiments corresponding to FIG. 9, in an embodiment of the communication method, after the NF entity receives the first response transmitted by the UPF entity, the method may further include the following steps: transmitting, by the NF entity, a third request to the UPF entity, the third request including the first ID; and receiving, by the NF entity, a third response transmitted by the UPF entity, the third response including the first ID and the third ID.

In this embodiment, a communication method for unsubscribing from a user plane event is described. That is, after an NF entity successfully subscribes to an event of a UPF entity, the NF entity may transmit a third request to a UPF entity by using an interface. The third request needs to include a first ID. The first ID herein is used for indicating the event, and each event corresponds to a unique ID. The UPF entity performs authentication on the third request according to the third request transmitted by the NF entity, and then returns a third response, or may directly generate the third response according to the third request. The UPF entity transmits the third response to the NF entity. The third response includes the first ID and a third ID. The third ID is used for indicating the NF entity. A target NF entity can be determined based on the third ID. The target NF entity may be the NF entity that initiates the request to the UPF entity.

Figure 12:
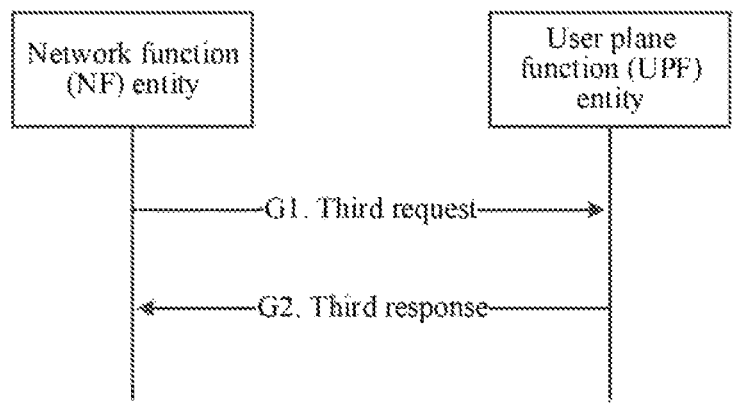
FIG. 12 is another schematic interaction flowchart of unsubscribing from a subscribed event according to an embodiment of this application.

For ease of understanding, refer to FIG. 12. FIG. 12 is another schematic interaction flowchart of unsubscribing from a subscribed event according to an embodiment of this application. As shown in the figure, after an NF entity subscribes to an event of a UPF entity, if the NF entity needs to unsubscribe from the event, the NF entity needs to initiate a UPF event subscription cancellation process, or trigger a PDU session subscription cancellation process.

In step G1, after the NF entity subscribes to an event of a specific UPF, if the NF entity needs to unsubscribe from the event, the NF entity needs to transmit a third request (that is, a UPF event subscription cancellation request) to the UPF entity.

The third request includes a first ID (that is, an ID for subscribing an exposed event of the UPF entity), and may further include a UPF ID. It may be understood that the first ID and the UPF ID may be encapsulated in a container of the third request.

In step G2, the UPF entity returns a third response to event subscription cancellation to the NF entity, the third response including the first ID (that is, the ID for subscribing the exposed event of the UPF entity) and a third ID (an NF ID).

Further, in this embodiment of this application, a communication method for unsubscribing from a user plane event is provided. First, an NF entity transmits a third request to a UPF entity, and the UPF entity then transmits a third response to the NF entity. In the foregoing manner, the NF entity may initiate an event subscription cancellation request to the UPF entity, so that the UPF entity transmits a response to the NF entity based on the request, thereby unsubscribing from a subscribed event. In this way, the NF entity can timely unsubscribe from the subscribed event, so as to save transmission resources.

Optionally, based on the embodiments corresponding to FIG. 9, in an embodiment of the communication method, after the NF entity receives the first response transmitted by the UPF entity, the method may further include receiving, by the NF entity, a message transmitted by the UPF entity, the message including the first ID, the second ID, and event information corresponding to the first request.

In this embodiment, a communication method for implementing user plane event notification is described. That is, after an NF entity subscribes to an event of a UPF entity, the UPF entity may obtain the event requested in a first request according to the first request, and obtain specific event information of the event. The UPF entity directly transmits a message including the specific event information to the NF entity. The message further needs to carry a first ID and a second ID in addition to event information corresponding to the first request. Optionally, after receiving the message, the NF entity may feed back a response message.

Figure 13:
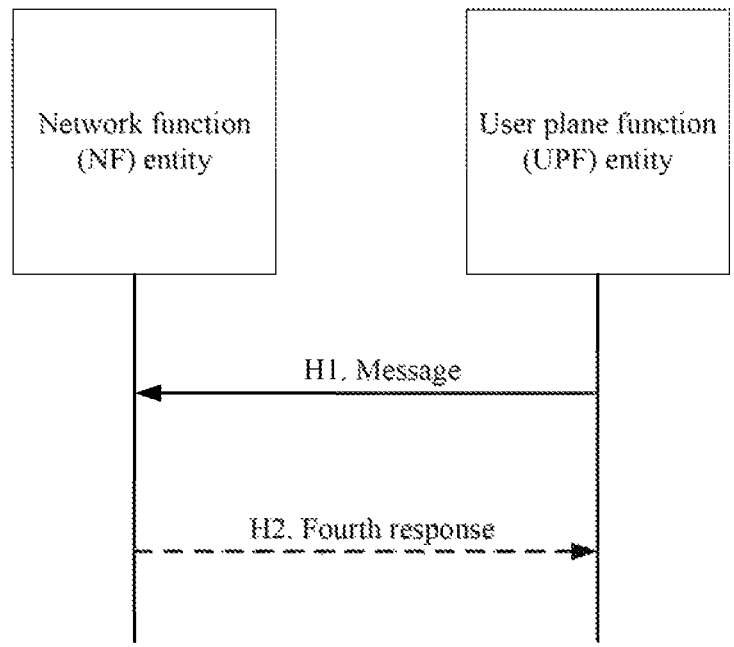
FIG. 13 is another schematic interaction flowchart of notification of a subscribed event according to an embodiment of this application.

For ease of understanding, refer to FIG. 13. FIG. 13 is another schematic interaction flowchart of notification of a subscribed event according to an embodiment of this application. As shown in the figure, when a UPF entity detects that a subscribed event occurs, the UPF entity initiates a UPF event exposing process to an NF entity that subscribes to the event.

In step H1, after the NF entity subscribes to an event of a specific UPF, when the UPF entity detects that a subscribed event occurs, the UPF entity triggers a message (that is, a UPF event notification) to the NF entity.

The message (that is, the UPF event notification) is transmitted in the form of a container. The container needs to include a first ID (that is, an ID for subscribing to an exposed event of the UPF entity), and may include a second ID (a type of the exposed event of the UPF entity). The container may further include information such as a UE ID, an N4 session ID, an event start time, an event end time, and a quantity of event occurrences.

Optionally, in step H2, after the NF entity receives the message, the NF entity may transmit a response message to the UPF entity.

Further, in this embodiment of this application, a communication method for implementing user plane event notification is provided. When a UPF entity detects event information, the UPF can transmit a message including the event information to an NF entity. In the foregoing manner, after the NF entity successfully subscribes to an event, the NF entity can receive a message fed back by the UPF entity, so as to obtain specific event information corresponding to the subscribed event, thereby improving the feasibility and operability of the solution.

Optionally, based on the embodiments corresponding to FIG. 9, in an embodiment of the communication method, the event information includes information corresponding to a UPF; or the event information includes information corresponding to UE; or the event information includes information corresponding to a single session of a single UE.

In this embodiment, a manner of event information granularity classification is provided. The event information may be classified into information of three types of granularity: information corresponding to the UPF entity, information corresponding to the UE, and information corresponding to the single session of the single UE. It may be understood that, the granularity is a concept that reflects a level of detail of information, and can indicate a degree of refinement of event information. For a relationship between an event type and an event information granularity, reference may be made to an embodiment corresponding to FIG. 3. Details are not described herein again.

Further, in this embodiment of this application, a manner of event information granularity classification is provided. In the foregoing manner, event information of three different types of granularity is defined. Event information may be respectively classified in terms of a UPF granularity, a UE granularity, and a session granularity, so that an NF entity can select corresponding information granularities based on different requirements, thereby helping to improve the flexibility and feasibility of the solution.

Optionally, based on the embodiments corresponding to FIG. 9, in an embodiment of the communication method, the first request further includes a UPF ID and the third ID. The UPF ID indicates the UPF entity. The first request further includes one or more of an average value, a maximum value, an event start time, an event end time, and a quantity of event occurrences. Alternatively, the first request further includes a UE ID or a UE group ID, the first request further includes at least one UPF ID and the third ID, and the first request further includes one or more of an average value, a maximum value, an event start time, an event end time, and a quantity of event occurrences. As another alternative, the first request further includes a UE ID, a UPF ID, the third ID, and a session ID, and the first request further includes one or more of an average value, a maximum value, an event start time, an event end time, and a quantity of event occurrences.

In this embodiment, information that can be carried in the first request based on different requirements is described. For a relationship between an event type and an event information granularity, reference may be made to an embodiment corresponding to FIG. 3. Details are not described herein again.

Further, information that may be carried in the first request based on different requirements is provided in this embodiment of this application. In the foregoing manner, the NF entity can request accurate event information from the UPF entity, which is beneficial to the feasibility and operability of the solution.

Figure 14:
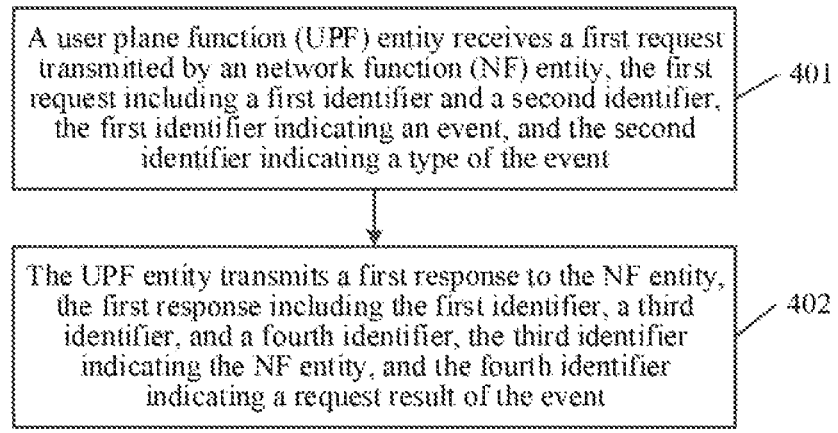
FIG. 14 is a schematic diagram of another embodiment of a communication method according to an embodiment of this application.

With reference to the foregoing description, another communication method in this application is described from a perspective of a UPF entity. Referring to FIG. 14, an embodiment of the communication method in the embodiments of this application includes the following steps.

In step 401, a UPF entity receives a first request transmitted by an NF entity, the first request including a first ID and a second ID, the first ID indicating an event, and the second ID indicating a type of the event.

In this embodiment, based on an evolved communication system architecture, when the UPF entity exposes an interface for direct communication with the NF entity, the NF entity may transmit the first request to the UPF entity by using the interface. The first request needs to carry the first ID and the second ID. The first ID is used for indicating an event, and each event corresponds to a unique ID. The first ID may be expressed as a container ID. The second ID is used for indicating the type of the event. Each event type corresponds to a unique ID. The second ID may be represented as an event type (container type), or a unique ID (container type ID) corresponding to the event type. The first ID and the second ID may be encapsulated in a container of the first request. For a correspondence between the second ID and an event type, reference may be made to the embodiments corresponding to FIG. 3. Details are not described herein again.

In step 402, the UPF entity transmits a first response to the NF entity, the first response including the first ID, a third ID, and a fourth ID, the third ID indicating the NF entity, and the fourth ID indicating a request result of the event.

In this embodiment, the UPF entity performs authentication on the first request and then returns the first response, or may directly generate the first response according to the first request. The UPF entity transmits the first response to the NF entity. The first response includes the first ID, the third ID, and the fourth ID. The third ID is used for indicating the NF entity. A target NF entity can be determined based on the third ID. The target NF entity may be the NF entity that initiates the request to the UPF entity. The fourth ID is used for indicating the request result of the event. The request result includes successfully subscribing to the event of the UPF entity or failing to subscribe to the event of the UPF entity. For example, if the fourth ID is 1, it indicates that the NF entity has successfully subscribed to the event of the UPF entity. If the fourth ID is 0, it indicates that the NF entity fails to subscribe to the event of the UPF entity. It may be understood that the fourth ID may alternatively be represented by another ID. This is merely an example herein and is not to be understood as a limitation on this application.

After the UPF entity transmits the first response to the NF entity, the NF entity may determine whether an event provided by the UPF entity is successfully subscribed to currently. If the event is successfully subscribed to, the NF entity subsequently receives specific event information transmitted by the UPF entity.

For an interaction process between the NF entity and the UPF entity, reference may be made to the embodiment corresponding to FIG. 11. Details are not described herein again.

In the embodiments of this application, another communication method for exposing a UPF event is provided. An NF entity may directly transmit a first request to a UPF entity. The first request includes a first ID and a second ID. The UPF entity transmits a first response to the NF entity. The first response includes the first ID, a third ID, and a fourth ID. In the foregoing manner, the NF entity may initiate an event subscription request to the UPF entity, so that the UPF entity transmits a response to the NF entity based on the request, thereby exposing a UPF event to the NF entity. In this way, the NF entity can perceive information on a user plane, and further perform operations, such as policy control, based on the information on the user plane.

Optionally, based on the embodiments corresponding to FIG. 14, in an embodiment of the communication method, after the UPF entity transmits the first response to the NF entity, the method may further include the following steps: receiving, by the UPF entity, a second request transmitted by the NF entity, the second request including the first ID and event update information; and transmitting, by the UPF entity, a second response to the NF entity, the second response including the first ID, the third ID, and a fifth ID, the fifth ID indicating an update request result of the event.

In this embodiment, a communication method for updating a user plane event is described. For a specific implementation, reference may be made to the embodiment corresponding to FIG. 9. For an interaction process between an NF entity and a UPF entity, reference may be made to the embodiment corresponding to FIG. 11. Details are not described herein again.

Further, in this embodiment of this application, a communication method for updating an UPF event is provided. In the foregoing manner, an NF entity may initiate an event subscription update request to a UPF entity, so that the UPF entity transmits a response to the NF entity based on the request, thereby updating a subscribed event, so that the NF entity can more flexibly adjust to-be-obtained content of the subscribed event.

Optionally, based on the embodiments corresponding to FIG. 14, in an embodiment of the communication method, after the UPF entity transmits the first response to the NF entity, the method may further include the following steps: receiving, by the UPF entity, a third request transmitted by the NF entity, the third request including the first ID; and transmitting, by the UPF entity, a third response to the NF entity, the third response including the first ID and the third ID.

In this embodiment, a communication Method for unsubscribing from a user plane event is described. For a specific implementation, reference may be made to the embodiment corresponding to FIG. 9. For an interaction process between an NF entity and a UPF entity, reference may be made to the embodiment corresponding to FIG. 12. Details are not described herein again.

Further, in this embodiment of this application, a communication method for unsubscribing from a user plane event is provided. First, an NF entity transmits a third request to a UPF entity, and the UPF entity then transmits a third response to the NF entity. In the foregoing manner, the NF entity may initiate an event subscription cancellation request to the UPF entity, so that the UPF entity transmits a response to the NF entity based on the request, thereby unsubscribing from a subscribed event. In this way, the NF entity can timely unsubscribe from the subscribed event, so as to save transmission resources.

Optionally, based on the embodiments corresponding to FIG. 14, in an embodiment of the communication method, after the NF entity receives the first response transmitted by the UPF entity, the method may further include the following step: transmitting, by the UPF entity, a message to the NF entity, the message including the first ID, the second ID, and event information corresponding to the first request.

In this embodiment, a communication method for implementing user plane event notification is described. For a specific implementation, reference may be made to the embodiment corresponding to FIG. 9. For an interaction process between an NF entity and a UPF entity, reference may be made to the embodiment corresponding to FIG. 13. Details are not described herein again.

Further, in this embodiment of this application, a communication method for implementing user plane event notification is provided. When a UPF entity detects event information, the UPF can transmit a message including the event information to an NF entity. In the foregoing manner, after the NF entity successfully subscribes to an event, the NF entity can receive a message fed back by the UPF entity, so as to obtain specific event information corresponding to the subscribed event, thereby improving the feasibility and operability of the solution.

Figure 15:
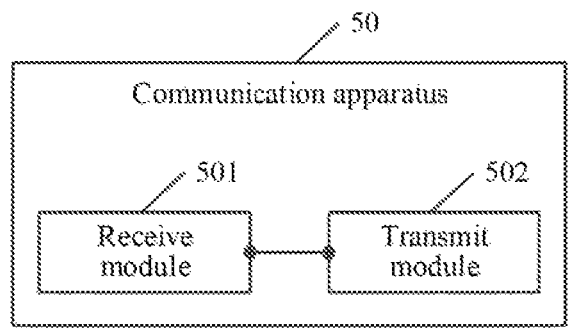
FIG. 15 is a schematic diagram of an embodiment of a communication apparatus according to an embodiment of this application.

A communication apparatus in this application described below in detail. FIG. 15 is a schematic diagram of an embodiment of a communication apparatus according to an embodiment of this application. The communication apparatus 50 includes: a receive module 501 (for example, a receiver embodied in circuitry), configured to receive a first request transmitted by an NF entity, the first request including a first ID and a second ID, the first ID indicating an event, and the second ID indicating a type of the event; and a transmit module 502 (for example, a transmitter embodied in circuitry), configured to transmit the first request received by the receive module 501 to a UPF entity. The receive module 501 is further configured to receive a first response transmitted by the UPF entity, the first response including the first ID, a third ID, and a fourth ID, the third ID indicating the NF entity, and the fourth ID indicating a request result of the event, and the transmit module 502 being further configured to transmit the first response received by the receive module 501 to the NF entity.

Optionally, based on the embodiment corresponding to FIG. 15, in another embodiment of the communication apparatus 50 provided in this embodiment of this application, the receive module 501 is further configured to receive, after the transmit module 502 transmits the first response to the NF entity, a second request transmitted by the NF entity, the second request including the first ID and event update information. The transmit module 502 is further configured to transmit the second request received by the receive module 501 to the UPF entity, and the receive module 501 is further configured to receive a second response transmitted by the UPF entity, the second response including the first ID, the third ID, and a fifth ID, the fifth ID indicating an update request result of the event. The transmit module 502 is further configured to transmit the second response received by the receive module 501 to the NF entity.

Optionally, based on the embodiment corresponding to FIG. 15, in another embodiment of the communication apparatus 50 provided in this embodiment of this application, the receive module 501 is further configured to receive, after the transmit module 502 transmits the first response to the NF entity, a third request transmitted by the NF entity, the third request including the first ID. The transmit module 502 is further configured to transmit the third request received by the receive module 501 to the UPF entity, and the receive module 501 is further configured to receive a third response transmitted by the UPF entity, the third response including the first ID and the third ID. The transmit module 502 is further configured to transmit the third response received by the receive module 501 to the NF entity.

Optionally, based on the embodiment corresponding to FIG. 15, in another embodiment of the communication apparatus 50 provided in this embodiment of this application, the receive module 501 is further configured to receive, after the transmit module 502 transmits the first response to the NF entity, a message transmitted by the UPF entity, the message including the first ID, the second ID, and event information corresponding to the first request; and the transmit module 502 is further configured to transmit the message received by the receive module 501 to the NF entity.

Optionally, based on the embodiment corresponding to FIG. 15, in another embodiment of the communication apparatus 50 provided in this embodiment of this application, the event information includes information corresponding to a UPF. Alternatively, the event information includes information corresponding to UE. As another alternative, the event information includes information corresponding to a single session of a single UE.

Optionally, based on the embodiment corresponding to FIG. 15, in another embodiment of the communication apparatus 50 provided in this embodiment of this application, the first request further includes a UPF ID and the third ID. The UPF ID indicates the UPF entity. The first request further includes one or more of an average value, a maximum value, an event start time, an event end time, and a quantity of event occurrences. Alternatively, the first request further includes a user equipment (UE) ID of a UE group ID, the first request further includes at least one UPF ID and the third ID, and the first request further includes one or more of an average value, a maximum value, an event start time, an event end time, and a quantity of event occurrences. As another alternative, the first request further includes a UE ID, a UPF ID, the third ID, and a session ID, and the first request further includes one or more of an average value, a maximum value, an event start time, an event end time, and a quantity of event occurrences.

Figure 16:
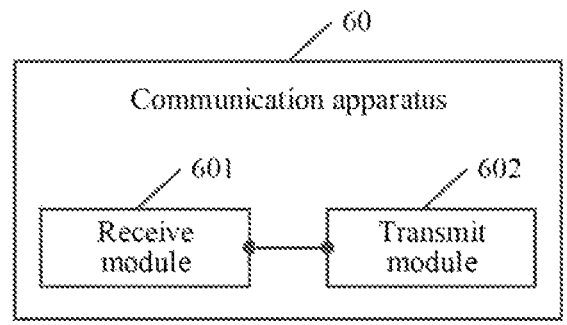
FIG. 16 is a schematic diagram of another embodiment of a communication apparatus according to an embodiment of this application.

A communication apparatus in this application is described below in detail. FIG. 16 is a schematic diagram of an embodiment of a communication apparatus according to an embodiment of this application. The communication apparatus 60 includes: a receive module 601 (for example a receiver embodied in circuitry), configured to receive a first request transmitted by an SMF entity, the first request including a first ID and a second ID, the first ID indicating an event, and the second ID indicating a type of the event; and a transmit module 602 (for example, a transmitter embodied in circuitry), configured to transmit a first response to the SMF entity, the first response including the first ID, a third ID, and a fourth ID, the third ID indicating an NF entity, and the fourth ID indicating a request result of the event.

Optionally, based on the embodiment corresponding to FIG. 16, in another embodiment of the communication apparatus 60 provided in this embodiment of this application, the receive module 601 is further configured to receive, after the transmit module 602 transmits the first response to the SMF entity, a second request transmitted by the SMF entity, the second request being transmitted by the NF entity to the SMF entity, the second request including the first ID, the second ID, and event update information; and the transmit module 602 is further configured to transmit a second response to the SMF entity, the second response including the first ID, the third ID, and a fifth ID, the fifth ID indicating an update request result of the event.

Optionally, based on the embodiment corresponding to FIG. 16, in another embodiment of the communication apparatus 60 provided in this embodiment of this application, the receive module 601 is further configured to receive, after the transmit module 602 transmits the first response to the SMF entity, a third request transmitted by the SMF entity, the third request being transmitted by the NF entity to the SMF entity, and the third request including the first ID and the second ID; and the transmit module 602 is further configured to transmit a third response to the SMF entity, the third response including the first ID and the third ID.

Optionally, based on the embodiment corresponding to FIG. 16, in another embodiment of the communication apparatus 60 provided in this embodiment of this application, the receive module 601 is further configured to transmit a message to the SMF entity after the transmit module 602 transmits the first response to the SMF entity, the message including the first ID, the second ID, and event information corresponding to the first request.

Optionally, based on the embodiment corresponding to FIG. 16, in another embodiment of the communication apparatus 60 provided in this embodiment of this application, the event information includes information corresponding to a UPF. Alternatively, the event information includes information corresponding to UE. As another alternative, the event information includes information corresponding to a single session of a single UE.

Optionally, based on the embodiment corresponding to FIG. 16, in another embodiment of the communication apparatus 60 provided in this embodiment of this application, the first request further includes a UPF ID and the third ID. The UPF ID indicates the UPF entity. The first request further includes one or more of an average value, a maximum value, an event start time, an event end time, and a quantity of event occurrences. Alternatively, the first request further includes a UE ID or a UE group ID, the first request further includes at least one UPF ID and the third ID, and the first request further includes one or more of an average value, a maximum value, an event start time, an event end time, and a quantity of event occurrences. As another alternative, the first request further includes a UE ID, a UPF ID, the third ID, an average value, a maximum value, an event start time, an event end time, and a quantity of event occurrences.

Figure 17:
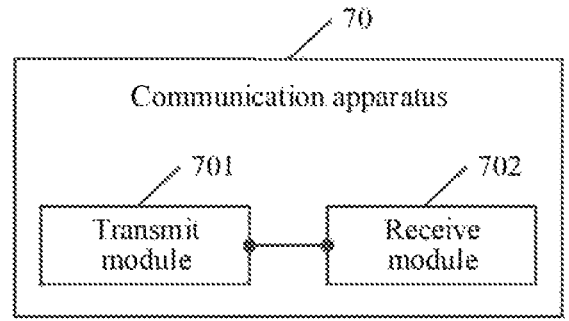
FIG. 17 is a schematic diagram of another embodiment of a communication apparatus according to an embodiment of this application.

A communication apparatus in this application is described below in detail. FIG. 17 is a schematic diagram of an embodiment of a communication apparatus according to an embodiment of this application. The communication apparatus 70 includes: a transmit module 701 (for example, a transmitter embodied in circuitry), configured to transmit a first request to a UPF entity, the first request including a first ID and a second ID, the first ID indicating an event, and the second ID indicating a type of the event; and a receive module 702 (for example, a receiver embodied in circuitry), configured to receive a first response transmitted by the UPF entity, the first response including the first ID, a third ID, and a fourth ID, the third ID indicating an NF entity, and the fourth ID indicating a request result of the event.

Optionally, based on the embodiment corresponding to FIG. 17, in another embodiment of the communication apparatus 70 provided in this embodiment of this application, the transmit module 701 is further configured to transmit, after the receive module 702 receives the first response transmitted by the UPF entity, a second request to the UPF entity, the second request including the first ID and event update information; and the receive module 702 is further configured to receive a second response transmitted by the UPF entity, the second response including the first ID, the third ID, and a fifth ID, the fifth ID indicating an update request result of the event.

Optionally, based on the embodiment corresponding to FIG. 17, in another embodiment of the communication apparatus 70 provided in this embodiment of this application, the transmit module 701 is further configured to transmit, after the receive module 702 receives the first response transmitted by the UPF entity, a third request to the UPF entity, the third request including the first ID; and the receive module 702 is further configured to receive a third response transmitted by the UPF entity, the third response including the first ID and the third ID.

Optionally, based on the embodiment corresponding to FIG. 17, in another embodiment of the communication apparatus 70 provided in this embodiment of this application, the receive module 702 is further configured to receive, after receiving the first response transmitted by the UPF entity, a message transmitted by the UPF entity, the message including the first ID, the second ID, and event information corresponding to the first request.

Optionally, based on the embodiment corresponding to FIG. 17, in another embodiment of the communication apparatus 70 provided in this embodiment of this application, the event information includes information corresponding to a UPF. Alternatively, the event information includes information corresponding to UE. As another alternative, the event information includes information corresponding to a single session of a single UE.

Optionally, based on the embodiment corresponding to FIG. 17, in another embodiment of the communication apparatus 70 provided in this embodiment of this application, the first request further includes a UPF ID and the third ID. The UPF ID indicates the UPF entity. The first request further includes one or more of an average value, a maximum value, an event start time, an event end time, and a quantity of event occurrences. Alternatively, the first request further includes a user equipment (UE) ID or a UE group ID, the first request further includes at least one UPF ID and the third ID, and the first request further includes one or more of an average value, a maximum value, an event start time, an event end time, and a quantity of event occurrences. In another alternative, the first request further includes a UE ID, a UPF ID, the third ID, and a session ID, and the first request further includes one or more of an average value, a maximum value, an event start time, an event end time, and a quantity of event occurrences.

Figure 18:
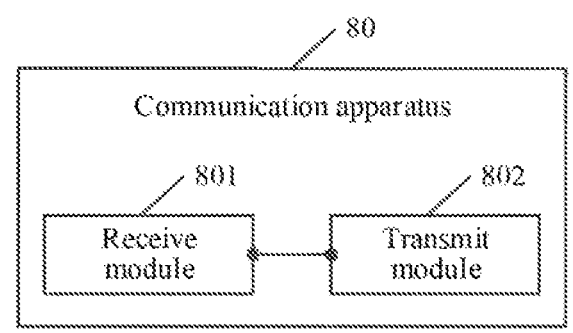
FIG. 18 is a schematic diagram of another embodiment of a communication apparatus according to an embodiment of this application.

A communication apparatus in this application is described below in detail. FIG. 18 is a schematic diagram of an embodiment of a communication apparatus according to an embodiment of this application. The communication apparatus 80 includes: a receive module 801 (for example, a receiver embodied in circuitry), configured to receive a first request transmitted by an NF entity, the first request including a first ID and a second ID, the first ID indicating an event, and the second ID indicating a type of the event; and a transmit module 802 (for example, a transmitter embodied in circuitry), configured to transmit a first response to the NF entity, the first response including the first ID, a third ID, and a fourth ID, the third ID indicating the NF entity, and the fourth ID indicating a request result of the event.

Optionally, based on the embodiment corresponding to FIG. 18, in another embodiment of the communication apparatus 80 provided in this embodiment of this application, the receive module 801 is further configured to receive, after the transmit module 802 transmits the first response to the NF entity, a second request transmitted by the NF entity, the second request including the first ID and event update information; and the transmit module 802 is further configured to transmit a second response to the NF entity, the second response including the first ID, the third ID, and a fifth ID, the fifth ID indicating an update request result of the event.

Optionally, based on the embodiment corresponding to FIG. 18, in another embodiment of the communication apparatus 80 provided in this embodiment of this application, the receive module 801 is further configured to receive, after the transmit module 802 transmits the first response to the NF entity, a third request transmitted by the NF entity, the third request including the first ID; and the transmit module 802 is further configured to transmit a third response to the NF entity, the third response including the first ID and the third ID.

Optionally, based on the embodiment corresponding to FIG. 18, in another embodiment of the communication apparatus 80 provided in this embodiment of this application, the transmit module 802 is further configured to transmit a message to the NF entity after the transmit module 802 transmits the first response to the NF entity, the message including the first ID, the second ID, and event information corresponding to the first request.

Optionally, based on the embodiment corresponding to FIG. 18, in another embodiment of the communication apparatus 80 provided in this embodiment of this application, the event information includes information corresponding to a UPF. Alternatively, the event information includes information corresponding to UE. In another alternative, the event information includes information corresponding to a single session of a single UE.

Optionally, based on the embodiment corresponding to FIG. 18, in another embodiment of the communication apparatus 80 provided in this embodiment of this application, the first request further includes a UPF ID and the third ID. The UPF ID indicates a UPF entity. The first request further includes one or more of an average value, a maximum value, an event start time, an event end time, and a quantity of event occurrences. Alternatively, the first request further includes a user equipment (UE) ID or a UE group ID, the first request further includes at least one UPF ID and the third ID, and the first request further includes one or more of an average value, a maximum value, an event start time, an event end time, and a quantity of event occurrences. In another alternative, the first request further includes a UE ID, a UPF ID, the third ID, and a session ID, and the first request further includes one or more of an average value, a maximum value, an event start time, an event end time, and a quantity of event occurrences.

Figure 19:
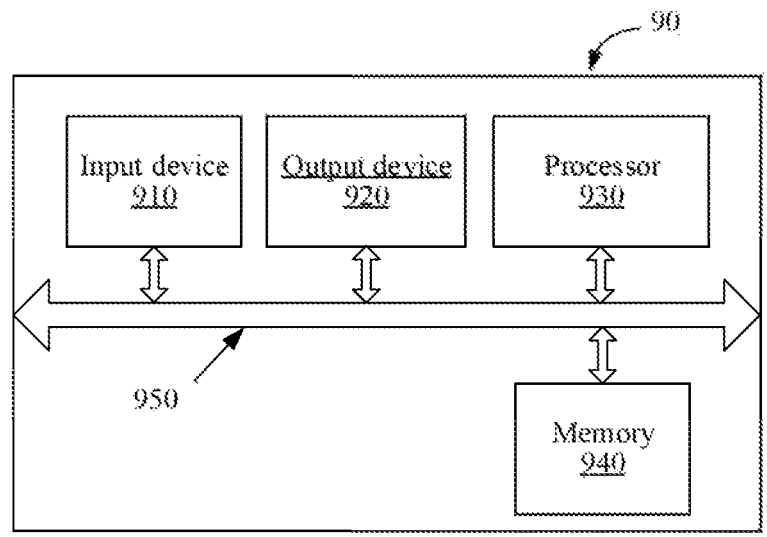
FIG. 19 is a schematic structural diagram of a network device according to an embodiment of this application.

The communication apparatus provided in this application may be deployed on a network device. The network device (including processing circuitry) in this embodiment may be specifically an SMF entity, an NF entity, or a UPF entity. For ease of description, refer to FIG. 19. FIG. 19 is a schematic structural diagram of a network device 90 according to an embodiment of this application. The network device 90 may include an input device 910, an output device 920, a processor 930, and a non-transitory memory 940. The output device in this embodiment of this application may be a display device.

The memory 940 may include a read-only memory (ROM) and a random access memory (RAM), and provide instructions and data to the processor 930. A part of the memory 940 may further include a non-volatile random access memory (NVRAM for short).

The memory 940 stores the following elements, executable modules or data structures, or a subset thereof, or an extended set thereof, including computer-readable instructions that, when executed by a processor, cause the processor to perform various operations; and an operating system including various system programs, used for implementing various fundamental services and processing hardware-based tasks.

In a case that the network device is specifically an SMF entity, the processor 930 in this embodiment of this application is configured to: control the input device 910 to receive a first request transmitted by an NF entity, the first request including a first ID and a second ID, the first ID indicating an event, and the second ID indicating a type of the event, and control the output device 920 to transmit the first request to a UPF entity. The processor 930 is further configured to control the input device 910 to receive a first response transmitted by the UPF entity, the first response including the first ID, a third ID, and a fourth ID, the third ID indicating the NF entity, and the fourth ID indicating a request result of the event, and control the output device 920 to transmit the first response to the NF entity.

Optionally, in this embodiment of this application, the processor 930 is further configured to: control the input device 910 to receive a second request transmitted by the NF entity, the second request including the first ID and event update information, and control the output device 920 to transmit the second request to the UPF entity. The processor 930 is further configured to control the input device 910 to receive a second response transmitted by the UPF entity, the second response including the first ID, the third ID, and a fifth ID, the fifth ID indicating an update request result of the event, and control the output device 920 to transmit the second response to the NF entity.

Optionally, in this embodiment of this application, the processor 930 is further configured to: control the input device 910 to receive a third request transmitted by the NF entity, the third request including the first ID, and control the output device 920 to transmit the third request to the UPF entity. The processor 930 is further configured to control the input device 910 to receive a third response transmitted by the UPF entity, the third response including the first ID and the third ID, and control the output device 920 to transmit the third response to the NF entity.

Optionally, in this embodiment of this application, the processor 930 is further configured to: control the input device 910 to receive a message transmitted by the UPF entity, the message including the first ID, the second ID, and event information corresponding to the first request; and control the output device 920 to transmit the message to the NF entity.

In a case that the network device is specifically a UPF entity, the processor 930 in this embodiment of this application is configured to: control the input device 910 to receive a first request transmitted by an SMF entity, the first request including a first ID and a second ID, the first ID indicating an event, and the second ID indicating a type of the event; and control the output device 920 to transmit a first response to the SMF entity, the first response including the first ID, a third ID, and a fourth ID, the third ID indicating an NF entity, and the fourth ID indicating a request result of the event.

Optionally, in this embodiment of this application, the processor 930 is further configured to: control the input device 910 to receive a second request transmitted by the SMF entity, the second request being transmitted by the NF entity to the SMF entity, and the second request including the first ID, the second ID, and event update information; and control the output device 920 to transmit a second response to the SMF entity, the second response including the first, ID, the third ID, and a fifth ID, the fifth ID indicating an update request result of the event.

Optionally, in this embodiment of this application, the processor 930 is further configured to; control the input device 910 to receive a third request transmitted by the SMF entity, the third request being transmitted by the NF entity to the SMF entity, and the third request including the first ID and the second ID; and control the output device 920 to transmit a third response to the SMF entity, the third response including the first ID and the third ID.

Optionally, in this embodiment of this application, the processor 930 is further configured to: control the output device 920 to transmit a message to the SMF entity, the message including the first ID, the second ID, and event information corresponding to the first request.

In a case that the network device is specifically an NF entity, the processor 930 in this embodiment of this application is configured to: control the output device 920 to transmit a first request to a UPF entity, the first request including a first ID and a second ID, the first ID indicating an event, and the second ID indicating a type of the event; and control the input device 910 to receive a first response transmitted by the UPF entity, the first response including the first ID, a third ID, and a fourth ID, the third ID indicating the NF entity, and the fourth ID indicating a request result of the event.

Optionally, in this embodiment of this application, the processor 930 is further configured to; control the output device 920 to transmit a second request to the UPF entity, the second request including the first ID and event update information; and control the input device 910 to receive a second response transmitted by the UPF entity, the second response including the first ID, the third ID, and a fifth ID, the fifth ID indicating an update request result of the event.

Optionally, in this embodiment of this application, the processor 930 is further configured to: control the output device 920 to transmit a third request to the UPF entity, the third request including the first ID; and control the input device 910 to receive a third response transmitted by the UPF entity, the third response including the first ID and the third ID.

Optionally, in this embodiment of this application, the processor 930 is further configured to: control the input device 910 to receive a message transmitted by the UPF entity, the message including the first ID, the second ID, and event information corresponding to the first request.

In a case that the network device is specifically a UPF entity, the processor 930 in this embodiment of this application is configured to: control the input device 910 to receive a first request transmitted by an NF entity, the first request including a first ID and a second ID, the first ID indicating an event, and the second ID indicating a type of the event; and control the output device 920 to transmit a first response to the NF entity, the first response including the first ID, a third ID, and a fourth ID, the third ID indicating the NF entity, and the fourth ID indicating a request result of the event.

Optionally, in this embodiment of this application, the processor 930 is further configured to: control the input device 910 to receive a second request transmitted by the NF entity, the second request including the first ID and event update information; and control the output device 920 to transmit a second response to the NF entity, the second response including the first ID, the third ID, and a fifth ID, the fifth ID indicating an update request result of the event.

Optionally, in this embodiment of this application, the processor 930 is further configured to: control the input device 910 to receive a third request transmitted by the NF entity, the third request including the first ID; and control the output device 920 to transmit a third response to the NF entity, the third response including the first ID and the third ID.

Optionally, in this embodiment of this application, the processor 930 is further configured to: control the output device 920 to transmit a message to the NF entity, the message including the first ID, the second ID, and event information corresponding to the first request.

The processor 930 controls an operation of the network device 90. The processor 930 may also be referred to as a central processing unit (CPU for short). The memory 940 may include a read-only memory (ROM) and a random access memory (RAM), and provide instructions and data to the processor 930. A part of the memory 940 may further include an NVRAM. In a specific application, components of the network device 90 are coupled by using the bus system 950, and the bus system 950 may further include a power bus, a control bus, a status signal bus, and the like in addition to a data bus. However, for clear description, various types of buses in the figure are marked as the bus system 950.

The method disclosed in the foregoing embodiments of this application may be applied to the processor 930, or may be implemented by the processor 930. The processor 930 may be an integrated circuit chip having a signal processing capability. During implementation, the steps of the foregoing method may be completed through an integrated logic circuit of hardware or an instruction in the form of software in the processor 930. The processor 930 may be a general purpose processor, a digital signal processor (DSP for short), an application-specific integrated circuit (ASIC for short), a field-programmable gate array (FPGA for short) or another programmable logical device, a discrete gate or a transistor logical device, or a discrete hardware component. The processor can implement or execute methods, steps, and logical block diagrams disclosed in the embodiments of this application. The general-purpose processor may be a microprocessor, or the processor may be any conventional processor and the like. The steps of the methods disclosed with reference to the embodiments of this application may be directly performed by using a hardware decoding processor, or may be performed by using a combination of hardware and software modules in the decoding processor. The software module may be stored in a storage medium that is mature in the art, such as a RAM, a flash memory, a ROM, a programmable ROM, an electrically erasable programmable memory, or a register. The storage medium is located in the memory 940, and the processor 930 reads information in the memory 940 and completes the steps in the foregoing methods in combination with hardware of the processor.

For understanding of related descriptions of FIG. 19, reference may be made to the related descriptions and effects of the methods in FIG. 3 to FIG. 14. Details are not further described herein.

Persons skilled in the art can clearly understand that for convenience and conciseness of description, for specific working processes of the foregoing described system, apparatus and unit, reference may be made to the corresponding processes in the foregoing method embodiments, and details are not described herein.

In the several embodiments provided in this application, the disclosed system, apparatus, and method may be implemented in other manners. For example, the described apparatus embodiment is merely an example. For example, the unit division is merely a logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed over a plurality of network units. Some or all of the units may be selected according to actual requirements to achieve the objectives of the solutions in the embodiments.

In addition, functional units in the embodiments of this application may be integrated into one processing unit, or each of the units may exist alone physically, or two or more units may be integrated into one unit. The integrated unit may be implemented in the form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the related art, or all or some of the technical solutions may be implemented in the form of a software product. The computer software, product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing embodiments are merely intended for describing the technical solutions of this application, but not for limiting this application. Although this application is described in detail with reference to the foregoing embodiments, persons of ordinary skill in the art are to understand that they may still make modifications to the technical solutions described in the foregoing embodiments or make equivalent replacements to some technical features thereof, without departing from the spirit and scope of the technical solutions of the embodiments of this application.

What is claimed is:

1. A communication method, comprising:
    receiving, by a session management function (SMF) entity, a first request transmitted by a network function (NF) entity, the first request comprising a first identifier (ID) and a second ID, the first ID indicating an event, and the second ID indicating a type of the event;
    transmitting, by the SMF entity, the first request to a user plane function (UPF) entity;
    receiving, by the SMF entity, a first response transmitted by the UPF entity, the first response comprising the first ID, a third ID, and a fourth ID, the third ID indicating the NF entity, and the fourth ID indicating a subscription request result of the event, the subscription request result indicating a status of a subscription to the event of the UPF; and
    transmitting, by the SMF entity, the first response to the NF entity.

2. The method according to claim 1, wherein after the transmitting the first response to the NF entity, the method further comprises:
    receiving, by the SMF entity, a second request transmitted by the NF entity, the second request comprising the first ID and event update information;
    transmitting, by the SMF entity, the second request to the UPF entity;
    receiving, by the SMF entity, a second response transmitted by the UPF entity, the second response comprising the first ID, the third ID, and a fifth ID, the fifth ID indicating an update request result of the event; and
    transmitting, by the SMF entity, the second response to the NF entity.

3. The method according to claim 1, wherein after the transmitting the first response to the NF entity, the method further comprises:
    receiving, by the SMF entity, a third request transmitted by the NF entity, the third request comprising the first ID;
    transmitting, by the SMF entity, the third request to the UPF entity;
    receiving, by the SMF entity, a third response transmitted by the UPF entity, the third response comprising the first ID and the third ID; and
    transmitting, by the SMF entity, the third response to the NF entity.

4. The method according to claim 1, wherein the first request further comprises a UPF ID and the third ID, the UPF ID indicates the UPF entity, and the first request further comprises one or more of an average value, a maximum value, an event start time, an event end time, and a quantity of event occurrences; or
    the first request further comprises a user equipment (UE) ID or a UE group ID, the first request further comprises at least one UPF ID and the third ID, and the first request further comprises one or more of the average value, the maximum value, the event start time, the event end time, and the quantity of event occurrences; or
    the first request further comprises the UE ID, the UPF ID, the third ID, and a session ID, and the first request further comprises one or more of the average value, the maximum value, the event start time, the event end time, and the quantity of event occurrences.

5. The method according to claim 4, wherein after the transmitting the first response to the NF entity, the method further comprises:
    receiving, by the SMF entity, a message transmitted by the UPF entity, the message comprising the first ID, the second ID, and event information corresponding to the first request; and transmitting, by the SMF entity, the message to the NF entity.

6. The method according to claim 5, wherein the event information comprises information corresponding to a UPF; or
the event information comprises information corresponding to a UE; or
the event information comprises information corresponding to a single session of a single UE.

7. A communication method, comprising:
receiving, by a user plane function (UPF) entity, a first request transmitted by a session management function (SMF) entity, the first request comprising a first identifier (ID) and a second ID, the first ID indicating an event, and the second ID indicating a type of the event; and
transmitting, by the UPF entity, a first response to the SMF entity, the first response comprising the first ID, a third ID, and a fourth ID, the third ID indicating a network function (NF) entity, and the fourth ID indicating a subscription request result of the event, the subscription request result indicating a status of a subscription to the event of the UPF.

8. The method according to claim 7, wherein, after the transmitting, the method further comprises:
receiving, by the UPF entity, a second request transmitted by the SMF entity, the second request being transmitted by the NF entity to the SMF entity, the second request comprising the first ID, the second ID, and event update information; and
transmitting, by the UPF entity, a second response to the SMF entity, the second response comprising the first ID, the third ID, and a fifth ID, the fifth ID indicating an update request result of the event.

9. The method according to claim 7, wherein, after the transmitting, the method further comprises:
receiving, by the UPF entity, a third request transmitted by the SMF entity, the third request being transmitted by the NF entity to the SMF entity, the third request comprising the first ID; and
transmitting, by the UPF entity, a third response to the SMF entity, the third response comprising the first ID and the third ID.

10. The method according to claim 7, wherein the first request further comprises a UPF ID and the third ID, the UPF ID indicates the UPF entity, and the first request further comprises one or more of an average value, a maximum value, an event start time, an event end time, and a quantity of event occurrences; or
the first request further comprises a user equipment (UE) ID or a UE group ID, the first request further comprises at least one UPF ID and the third ID, and the first request further comprises one or more of the average value, the maximum value, the event start time, the event end time, and the quantity of event occurrences; or
the first request further comprises the UE ID, the UPF ID, the third ID, and a session ID, and the first request further comprises one or more of the average value, the maximum value, the event start time, the event end time, and the quantity of event occurrences.

11. The method according to claim 10, wherein, after the transmitting, the method further comprises:
transmitting, by the UPF entity, a message to the SMF entity, the message comprising the first ID, the second ID, and event information corresponding to the first request.

12. A communication apparatus, comprising:
a receiver configured to receive a first request transmitted by a network function (NF) entity, the first request comprising a first identifier (ID) and a second ID, the first ID indicating an event, and the second ID indicating a type of the event; and
a transmitter configured to transmit the first request received by the receiver to a user plane function (UPF) entity,
the receiver being further configured to receive a first response transmitted by the UPF entity, the first response comprising the first ID, a third ID, and a fourth ID, the third ID indicating the NF entity, and the fourth ID indicating a subscription request result of the event, the subscription request result indicating a status of a subscription to the event of the UPF, and
the transmitter being further configured to transmit the first response received by the receiver to the NF entity.

13. The communication apparatus according to claim 12, wherein, after the transmitter transmits the first response to the NF entity,
the receiver receives a second request transmitted by the NF entity, the second request comprising the first ID and event update information;
the transmitter transmits the second request to the UPF entity;
the receiver receives a second response transmitted by the UPF entity, the second response comprising the first ID, the third ID, and a fifth ID, the fifth ID indicating an update request result of the event; and
the transmitter transmits the second response to the NF entity.

14. The communication apparatus according to claim 12, wherein, after the transmitter transmits the first response to the NF entity,
the receiver receives a third request transmitted by the NF entity, the third request comprising the first ID;
the transmitter transmits the third request to the UPF entity;
the receiver receives a third response transmitted by the UPF entity, the third response comprising the first ID and the third ID; and
the transmitter transmits the third response to the NF entity.

15. The communication apparatus according to claim 12, wherein the first request further comprises a UPF ID and the third ID, the UPF ID indicates the UPF entity, and the first request further comprises one or more of an average value, a maximum value, an event start time, an event end time, and a quantity of event occurrences; or
the first request further comprises a user equipment (UE) ID or a UE group ID, the first request further comprises at least one UPF ID and the third ID, and the first request further comprises one or more of the average value, the maximum value, the event start time, the event end time, and the quantity of event occurrences; or
the first request further comprises the UE ID, the UPF ID, the third ID, and a session ID, and the first request further comprises one or more of the average value, the maximum value, the event start time, the event end time, and the quantity of event occurrences.

16. The communication apparatus according to claim 15, wherein after the transmitter transmits the first response to the NF entity, the receiver receives a message transmitted by the UPF entity, the message comprising the first ID, the second ID, and event information corresponding to the first request; and the transmitter transmits the message to the NF entity.

17. The communication apparatus according to claim 16, wherein the event information comprises information corresponding to a UPF; or the event information comprises information corresponding to a UE; or the event information comprises information corresponding to a single session of a single UE.

18. A session management function (SMF) entity, comprising:

a memory, and a processor, the memory being configured to store a program, the processor being configured to execute the program in the memory, comprising performing the method according to claim 1.

19. A user plane function (UPF) entity, comprising:

a memory, and a processor, the memory being configured to store a program, the processor being configured to execute the program in the memory, comprising performing the method according to claim 7.

* * * * *